(12) United States Patent
Nishio

(10) Patent No.: US 10,499,028 B2
(45) Date of Patent: Dec. 3, 2019

(54) WHITE BALANCE ADJUSTING APPARATUS, OPERATION METHOD THEREOF, AND NON-TRANSITORY COMPUTER READABLE MEDIUM

(71) Applicant: FUJIFILM Corporation, Tokyo (JP)

(72) Inventor: Yuya Nishio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/145,995

(22) Filed: Sep. 28, 2018

(65) Prior Publication Data

US 2019/0037190 A1    Jan. 31, 2019

Related U.S. Application Data

(63) Continuation of application No. PCT/JP2017/006233, filed on Feb. 20, 2017.

(30) Foreign Application Priority Data

Mar. 31, 2016  (JP) .................................. 2016-073268

(51) Int. Cl.
   *H04N 9/73*       (2006.01)
   *G06T 7/00*       (2017.01)
   (Continued)

(52) U.S. Cl.
   CPC ............. *H04N 9/735* (2013.01); *G06T 5/008* (2013.01); *G06T 7/90* (2017.01); *G06T 7/97* (2017.01);
   (Continued)

(58) Field of Classification Search
   CPC ...................................................... H04N 9/735
   (Continued)

(56) References Cited

U.S. PATENT DOCUMENTS

| | | | | |
|---|---|---|---|---|
| 2007/0085911 A1* | 4/2007 | Nakamura | ............. | H04N 9/735 348/223.1 |
| 2007/0201853 A1* | 8/2007 | Petschnigg | ............ | G03B 15/03 396/155 |
| 2014/0036106 A1 | 2/2014 | Ouchi | | |

FOREIGN PATENT DOCUMENTS

| | | | |
|---|---|---|---|
| JP | 2010-193048 A | 9/2010 | |
| JP | 2012-134651 A | 7/2012 | |
| | (Continued) | | |

OTHER PUBLICATIONS

International Preliminary Report on Patentability and Written Opinion of the International Searching Authority (forms PCT/IB/373, PCT/ISA/237 and PCT/IB/326), dated Oct. 11, 2018, for corresponding International Application No. PCT/JP2017/006233, with an English translation of the Written Opinion.

(Continued)

*Primary Examiner* — Joel W Fosselman
(74) *Attorney, Agent, or Firm* — Birch, Stewart, Kolasch & Birch, LLP

(57) ABSTRACT

A non-emission image is obtained by a non-emission image obtaining unit in a state in which a plurality of flash devices do not emit light. Pre-emission images are obtained by an emission image obtaining unit in a state in which the plurality of flash devices individually emits light. Flash light irradiation areas are specified by a flash light irradiation area specifying unit based on a signal value difference of a plurality of division areas of the non-emission image and each of the emission images. A priority flash device selecting unit selects a priority flash device as a target of white balance (WB) adjustment. A WB adjusting unit performs WB adjustment based on signal values of irradiation areas of the selected priority flash device.

11 Claims, 18 Drawing Sheets

(51) Int. Cl.
 *G06T 7/90* (2017.01)
 *H04N 5/235* (2006.01)
 *G06T 5/00* (2006.01)
 *H04N 5/225* (2006.01)
 *H04N 5/232* (2006.01)

(52) U.S. Cl.
 CPC ......... *H04N 5/2256* (2013.01); *H04N 5/2351* (2013.01); *H04N 5/2354* (2013.01); *H04N 5/23219* (2013.01); *G06T 2207/20012* (2013.01); *G06T 2207/20021* (2013.01); *G06T 2207/30201* (2013.01)

(58) Field of Classification Search
 USPC ...................................................... 348/223.1
 See application file for complete search history.

(56) References Cited

FOREIGN PATENT DOCUMENTS

| | | |
|---|---|---|
| JP | 2013-17083 A | 1/2013 |
| JP | 2014-33276 A | 2/2014 |

OTHER PUBLICATIONS

International Search Report (form PCT/ISA/210), dated May 16, 2017, for corresponding International Application No. PCT/JP2017/006233, with an English translation.

Japanese Office Action dated Mar. 5, 2019, for corresponding Japanese Patent Application No. 2018-508574, with an English translation.

\* cited by examiner

FIG. 7
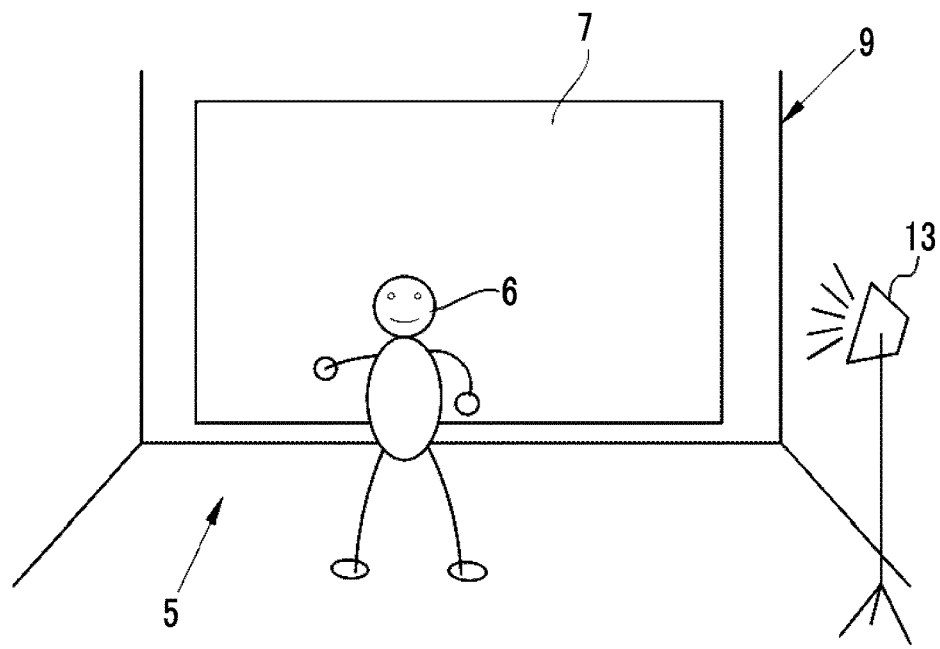
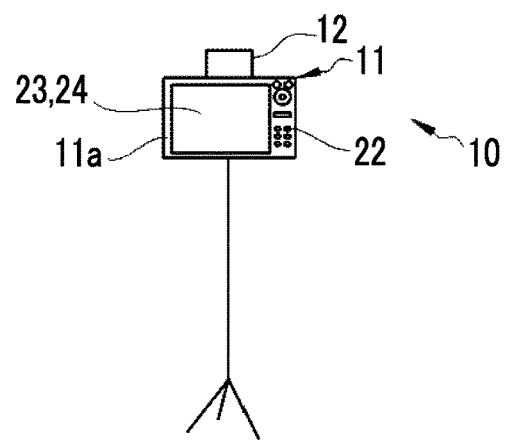
FIG. 8
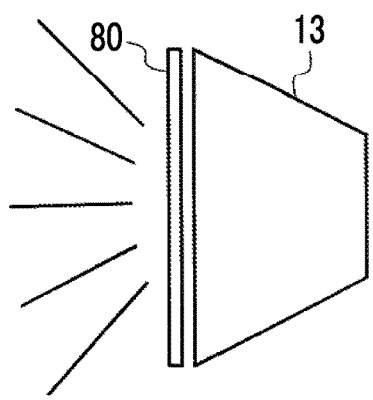

WHITE BALANCE ADJUSTING APPARATUS, OPERATION METHOD THEREOF, AND NON-TRANSITORY COMPUTER READABLE MEDIUM

CROSS-REFERENCE TO RELATED APPLICATIONS

This application is a Continuation of PCT International Application No. PCT/JP2017/006233 filed on 20 Feb. 2017, which claims priority under 35 U.S.C § 119(a) to Japanese Patent Application No. 2016-073268 filed on 31 Mar. 2016. The above application is hereby expressly incorporated by reference, in its entirety, into the present application.

BACKGROUND OF THE INVENTION

1. Field of the Invention

The present invention relates to a white balance adjusting apparatus, an operation method thereof, and a non-transitory computer readable medium which adjust white balance at the time of imaging using a plurality of auxiliary light sources.

2. Description of the Related Art

Human visual perception has color constancy. Accordingly, it is possible to perceive an original color of a subject irrespective of a difference of ambient light such as electric light, fluorescent light, or sunlight. In contrast, an image using an imaging device such as a digital camera is directly influenced by the ambient light. Thus, the imaging device has a white balance adjusting function of performing color conversion on the image such that the human can see a natural image by correcting the influence of the ambient light.

For example, a main subject is irradiated with mixed light of the ambient light with flash light on the image captured by the imaging device by using a flash device as an auxiliary light source. A background is less influenced by the flash light, and is mostly irradiated with the ambient light.

For example, in auto white balance adjustment at the time of general flash imaging, a ratio of the ambient light to the flash light (hereinafter, referred to as a mixed light ratio) is calculated, and white balance is adjusted according to the mixed light ratio, as described in JP2010-193048A. There is a tendency to irradiate the main subject with the flash light at the time of single flash imaging using one flash. Thus, the main subject has an appropriate tint by performing the auto white balance adjustment according to the mixed light ratio of a portion irradiated with the flash light.

SUMMARY OF THE INVENTION

However, in the imaging using a plurality of auxiliary light sources, for example, a plurality of flash devices, the portion strongly irradiated with the flash light may not be the main subject. For example, in a case where there is the plurality of auxiliary light sources such as the flash device that irradiates the main subject with the flash light and the flash device that irradiates the background with the flash light, the flash device that irradiates the background may strongly emit the light. In this case, in a case where the auto white balance adjustment is performed depending on the mixed light ratio in the portion strongly irradiated with the flash light, the image has a tint that emphasizes the background, and thus, the tint of the main subject becomes bad.

The present invention has been made in view of the circumstances, and an object of the present invention is to provide a white balance adjusting apparatus, an operation method thereof, and a non-transitory computer readable medium which allow a main subject to have an appropriate tint at the time of imaging using a plurality of auxiliary light sources.

In order to achieve the object, a white balance adjusting apparatus of the present invention comprises a non-emission image obtaining unit, an emission image obtaining unit, an auxiliary light irradiation area specifying unit, a priority auxiliary light source selecting unit, a white balance adjustment value calculating unit, and a white balance adjusting unit. The non-emission image obtaining unit obtains a non-emission image by imaging a subject in a state in which a plurality of auxiliary light sources does not emit light. The emission image obtaining unit obtains emission images of the auxiliary light sources by imaging the subject in a state in which the plurality of auxiliary light sources individually emits light. The auxiliary light irradiation area specifying unit divides the non-emission image and each of the emission images into a plurality of division areas, and specifies auxiliary light irradiation areas irradiated with auxiliary light of each of the auxiliary light sources based on a signal value difference of each division area between the state in which the plurality of auxiliary light sources individually emits light and the state in which the plurality of auxiliary light sources does not emit light. The priority auxiliary light source selecting unit selects a priority auxiliary light source as a target of white balance adjustment from the auxiliary light sources. The white balance adjustment value calculating unit calculates a white balance adjustment value based on signal values of priority auxiliary light irradiation areas irradiated with auxiliary light of the selected priority auxiliary light source. The white balance adjusting unit performs adjustment using the white balance adjustment value.

It is preferable that the priority auxiliary light source selecting unit includes a face area detecting unit and a priority auxiliary light source determining unit. The face area detecting unit detects face areas from the non-emission image or the emission images. The priority auxiliary light source determining unit specifies which of the auxiliary light irradiation areas the face areas detected by the face area detecting unit are present, and determines that the auxiliary light source corresponding to the auxiliary light irradiation areas including the face areas is the priority auxiliary light source.

The priority auxiliary light source selecting unit includes a priority auxiliary light source determining unit that determines the priority auxiliary light source based on previously stored light source color information of the auxiliary light source. The priority auxiliary light source determining unit sets a determination range in a color space by using the previously stored light source color information of the auxiliary light, light source color information of ambient light obtained from the non-emission image, and pixel information at the time of non-emission of the auxiliary light irradiation areas. The priority auxiliary light source determining unit determines the auxiliary light source corresponding to the auxiliary light irradiation areas as the priority auxiliary light source in a case where the pixel information based on the emission image is positioned within the determination range.

It is preferable that the priority auxiliary light source is determined based on the non-emission signal value average, the signal value average prediction value at the time of emission of the auxiliary light source, and the emission signal value average. The light source color information of the auxiliary light is coordinates indicating a color of the auxiliary light in a color space. The light source color information of the ambient light is coordinates which are obtained based on the non-emission image and indicate a color of the ambient light in the color space. The pixel information at the time of the non-emission of the auxiliary light irradiation areas is coordinates which are obtained based on the non-emission image and indicate a non-emission signal value average of the auxiliary light irradiation areas in the color space. The priority auxiliary light source determining unit calculates the emission signal value average which is the signal value average of the auxiliary light irradiation areas in the color space based on the emission image. The priority auxiliary light source determining unit calculates a difference vector which is a difference between the light source color information of the auxiliary light and the light source color information of the ambient light, and obtains the signal value average prediction value at the time of the emission of the auxiliary light source by adding the difference vector to the coordinates of the non-emission signal value average.

It is preferable that the priority auxiliary light source determining unit determines that the auxiliary light source is the priority auxiliary light source in a case where the emission signal value average is present in the determination range having the non-emission signal value average and the signal value average prediction value at the time of the emission of the auxiliary light source as both ends.

It is preferable that the priority auxiliary light source selecting unit includes a spatial frequency calculating unit and a priority auxiliary light source determining unit. The spatial frequency calculating unit that calculates a spatial frequency of the auxiliary light irradiation areas using each of the auxiliary light sources on the non-emission image. The priority auxiliary light source determining unit that excludes the auxiliary light source corresponding to the auxiliary light irradiation areas whose spatial frequency is equal to or smaller than a predetermined value from a selection target of the priority auxiliary light source and determines that the auxiliary light source remaining after the excluding is the priority auxiliary light source, in a case where the spatial frequency of the auxiliary light irradiation area using each of the auxiliary light sources is equal to or smaller than the predetermined value.

It is preferable that the white balance adjustment value calculating unit calculates actual-emission priority auxiliary light signal prediction values predicted as the signal values of the priority auxiliary light irradiation areas at the time of emitting the priority auxiliary light source with an emission amount at the time of actual emission and calculates a white balance adjustment value based on the actual-emission priority auxiliary light signal prediction values and the signal values at the time of the non-emission of the priority auxiliary light irradiation areas.

It is preferable that the white balance adjusting unit obtains an actual emission image obtained by imaging the subject in a state in which the plurality of auxiliary light sources emits light with an emission amount at the time of actual emission and performs the white balance adjustment using the white balance adjustment value on the actual emission image.

An operation method of a white balance adjusting apparatus of the present invention comprises a non-emission image obtaining step, an emission image obtaining step, an auxiliary light irradiation area specifying step, a priority auxiliary light source selecting step, a white balance adjustment value calculating step, and a white balance adjusting step. A non-transitory computer readable medium for storing a computer-executable program for execution of white balance adjustment of the present invention causes the computer to perform the above steps. In the non-emission image obtaining step, a non-emission image is obtained by imaging a subject in a state in which a plurality of auxiliary light sources does not emit light. In the emission image obtaining step, emission images of the auxiliary light sources are obtained by imaging the subject in a state in which the plurality of auxiliary light sources individually emits light. In the auxiliary light irradiation area specifying step, the non-emission image and each of the emission images are divided into a plurality of division areas, and auxiliary light irradiation areas irradiated with auxiliary light of each of the auxiliary light sources are specified based on a signal value difference of each division area between the state in which the plurality of auxiliary light sources individually emits light and the state in which the plurality of auxiliary light sources does not emit light. In the priority auxiliary light source selecting step, a priority auxiliary light source as a target of white balance adjustment is selected from the auxiliary light sources. In the white balance adjustment value calculating step, a white balance adjustment value is calculated based on signal values of priority auxiliary light irradiation areas irradiated with auxiliary light of the selected priority auxiliary light source. In the white balance adjusting step, adjustment using the white balance adjustment value is performed.

According to the present invention, it is possible to provide a white balance adjusting apparatus, an operation method thereof, and a non-transitory computer readable medium which allow a main subject to have an appropriate tint at the time of imaging using a plurality of auxiliary light sources.

BRIEF DESCRIPTION OF THE DRAWINGS

FIG. 7 is an overall perspective view showing a state in which the pre-emission image is captured by turning on a second flash device.

FIG. 8 is a side view showing a flash device including a special effect filter according to a second embodiment.

DESCRIPTION OF THE PREFERRED EMBODIMENTS

First Embodiment

Figure 1:
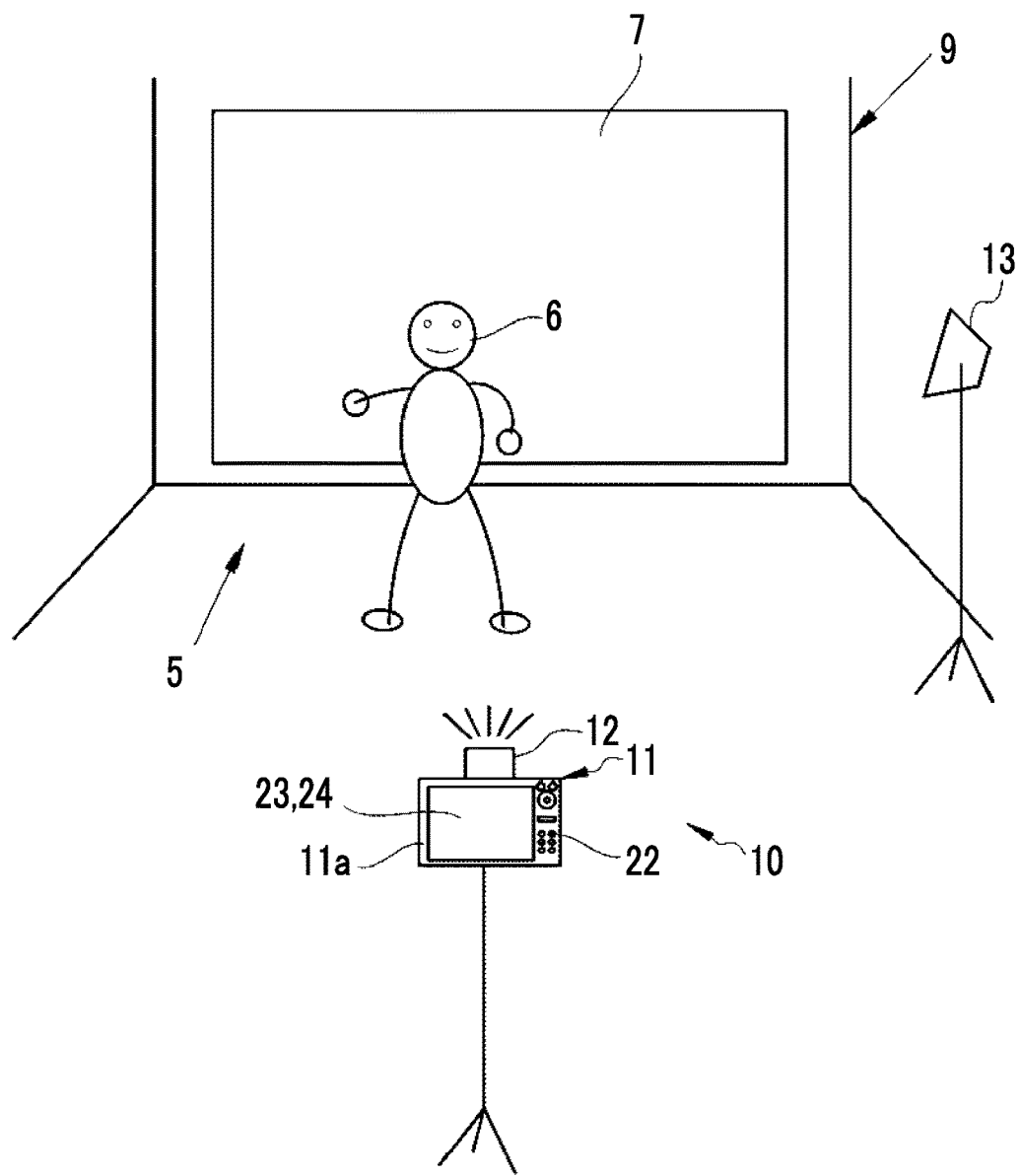
FIG. 1 is a perspective view showing the overall imaging system to which an embodiment of a white balance adjusting apparatus of the present invention is applied, and shows a state in which a pre-emission image is captured by turning on a flash light emitting unit of a camera.

FIG. 1 is an overall configuration diagram of an imaging system 10 to which an embodiment of a white balance (hereinafter, referred to as WB) adjusting apparatus of the invention is applied. For example, the imaging system 10 is used in an imaging studio 9 by using a plurality of flash devices 12 and 13 as auxiliary light sources. The imaging system 10 includes a digital camera (hereinafter, simply referred to as a camera) 11, and flash devices 12 and 13. The flash device 12 including a flash light emitting unit 14 (see FIG. 2) is built in the camera 11. The built-in flash device 12 functions as a first auxiliary light source in the imaging system 10. The flash device 13 is provided separately from the camera 11, and functions as a second auxiliary light source in the imaging system 10.

In the imaging system 10, when multi-illumination imaging is performed, the camera 11 controls a turning-on timing by transmitting a control signal to the first auxiliary light source (first flash device 12) and the second auxiliary light source (second flash device 13). The first flash device 12 irradiates a main subject 6 among subjects 5 with flash light, and the second flash device 13 irradiates a backdrop 7 disposed behind the main subject 6 among the subjects 5 with flash light. Although it has been described in the present embodiment that the flash device 12 built in the camera 11 is used as the first auxiliary light source, a flash device provided separately from the camera 11 or a flash device provided integrally with the camera 11 so as to be detachably attached may be used similarly to the second auxiliary light source.

Figure 2:
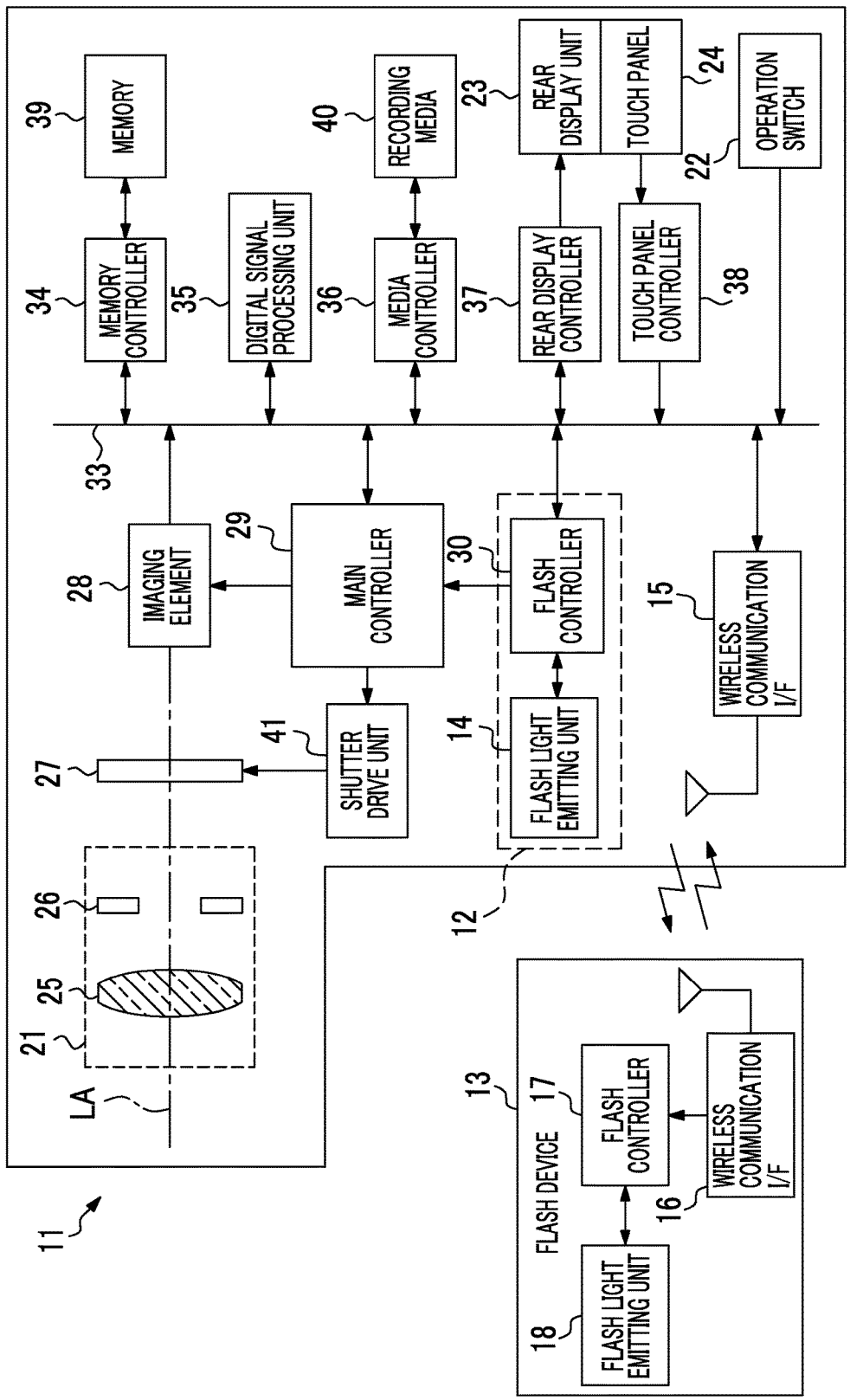
FIG. 2 is a functional block diagram of the camera and a flash device.

As shown in FIG. 2, the camera 11 and the flash device 13 include wireless communication interfaces (I/F) 15 and 16, respectively, and thus, the camera 11 and the flash device 13 can wirelessly communicate with each other. The camera and the flash device may perform wired communication instead of the wireless communication.

The flash device 13 includes a flash controller 17 and a flash light emitting unit 18 in addition to the wireless communication I/F 16. The flash device 13 receives a light amount adjusting signal sent from the camera 11 through the wireless communication I/F 16. The flash controller 17 controls the flash light emitting unit 18 to turn on the flash light emitting unit 18 according to the light amount adjusting signal. The turning-on of the flash light emitting unit 18 is flash emission of which light emission time has a unit of microseconds. The same is true of the flash light emitting unit 14 of the flash device 12 of the camera 11.

The camera 11 includes a lens barrel 21, an operation switch 22, and a rear display unit 23. The lens barrel 21 is provided on a front surface of a camera main body 11a (see FIG. 1), and holds an imaging optical system 25 and a stop 26.

The operation switch 22 is provided in plural on an upper portion or a rear surface of the camera main body 11a. The operation switch 22 receives an input operation for power turning ON and OFF operations, a release operation, and various settings. The rear display unit 23 is provided on the rear surface of the camera main body 11a, and displays images or live preview images obtained in various imaging modes and menu screens for performing various settings. A touch panel 24 is provided on a front surface of the rear display unit 23. The touch panel 24 is controlled by a touch panel controller 38, and transmits a command signal input through a touch operation to a main controller 29.

A shutter 27 and an imaging element 28 are disposed behind the imaging optical system 25 and the stop 26 in order along an optical axis LA of the imaging optical system 25. For example, the imaging element 28 is a complementary metal-oxide-semiconductor (CMOS) type image sensor of a single-plate color imaging type having red, green, and blue (RGB) color filters. The imaging element 28 images a subject image formed on an imaging surface by the imaging optical system 25, and outputs imaging signals.

The imaging element 28 includes a noise removing circuit, an autogain controller, and a signal processing circuit such as an analog/digital (A/D) conversion circuit (all are not shown). The noise removing circuit performs a noise removing process on the imaging signals. The autogain controller amplifies the level of the imaging signal to an optimum value. The A/D amplification circuit converts the imaging signals to digital signals, and outputs the digital signals to the imaging element 28.

The imaging element 28, the main controller 29, and the flash controller 30 are connected to a bus 33. The flash controller 30 and the flash light emitting unit 14 constitute the flash device 12 built in the camera 11. In addition, a memory controller 34, a digital signal processing unit 35, a media controller 36, a rear display controller 37, and a touch panel controller 38 are connected to the bus 33.

A transitory storage memory 39 such as a synchronous dynamic random-access memory (SDRAM) is connected to the memory controller 34. The memory controller 34 inputs and stores image data which are digital imaging signals output from the imaging element 28 to the memory 39. The memory controller 34 outputs the image data stored in the memory 39 to the digital signal processing unit 35.

The digital signal processing unit 35 performs the known image processing such as matrix calculation, demosaicing, WB adjustment, y correction, brightness and color difference conversion, resizing, or compression on the image data input from the memory 39.

The media controller 36 controls the recording and reading of the image data in and from a recording media 40. For example, the recording media 40 is a memory card having a flash memory built therein. The media controller 36 records the image data compressed by the digital signal processing unit 35 in the recording media 40 in a predetermined file format.

The rear display controller 37 controls an image display on the rear display unit 23. Specifically, the rear display controller 37 generates video signals conforming to the National Television System Committee (NTSC) standard based on the image data generated by the digital signal processing unit 35, and outputs the generated video signals to the rear display unit 23.

The main controller 29 controls an imaging process of the camera 11. Specifically, the main controller controls the shutter 27 through a shutter drive unit 41. The main controller controls the driving of the imaging element 28 in synchronization with the operation of the shutter 27. The camera 11 can set various imaging modes. The main controller 29 can perform imaging in the various imaging modes by controlling an F number of the stop 26 or an exposure time of the shutter 27 according to the set imaging mode.

In the camera 11 according to the present embodiment, a multi-illumination imaging mode is prepared in addition to the various normal imaging modes. The multi-illumination imaging modes are selected at the time of imaging using a plurality of auxiliary light sources. In the multi-illumination imaging mode, a priority flash device which is an auxiliary light source to which a priority is given in the WB adjustment is specified, and a WB adjustment value is calculated based on priority flash light (priority auxiliary light) which is flash light of the specified priority flash device. The WB adjustment is performed on an actual emission signal values obtained through the imaging of an actual emission image which is an image at the time of actual emission by using the calculated WB adjustment value. The WB adjustment value may be calculated after the priority flash device is specified or the actual emission signals are obtained.

In order to specify the priority flash device, the main controller 29 has a priority flash device selecting function. In a case where the multi-illumination imaging mode is selected, a priority flash device selecting process is performed before the actual emission image is captured. In the present embodiment, one flash device to which a priority is given is selected from two flash devices 12 and 13 in an imaging range of the imaging element 28 in the priority flash device selecting process.

Figure 3:
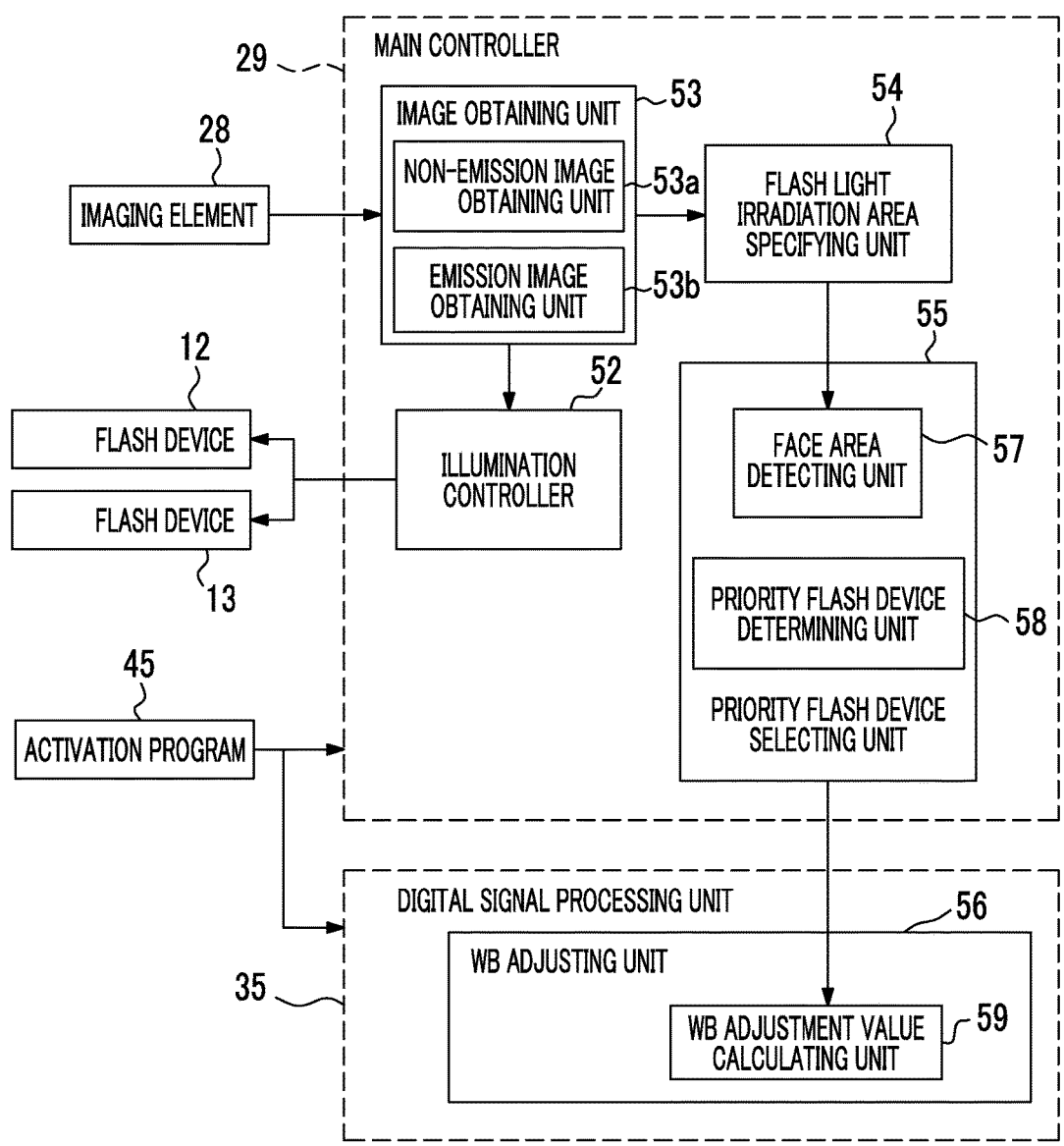
FIG. 3 is a functional block diagram of a main controller and a digital signal processing unit.

As shown in FIG. 3, in the multi-illumination imaging mode, the main controller 29 functions as an illumination controller 52, an image obtaining unit 53, a flash light irradiation area specifying unit (auxiliary light irradiation area specifying unit) 54 as an auxiliary light irradiation area specifying unit, and a priority flash device selecting unit 55 as a priority auxiliary light source selecting unit. These respective units are established by starting an operation program 45 stored in a nonvolatile memory (not shown) of the camera 11. Similarly, the digital signal processing unit 35 functions as a WB adjusting unit 56, and performs the WB adjustment based on the WB adjustment value.

The image obtaining unit 53 includes a non-emission image obtaining unit 53a and an emission image obtaining unit 53b. The priority flash device selecting unit 55 includes a face area detecting unit 57 and a priority flash device determining unit 58. The WB adjusting unit 56 includes a WB adjustment value calculating unit 59.

Figure 4:
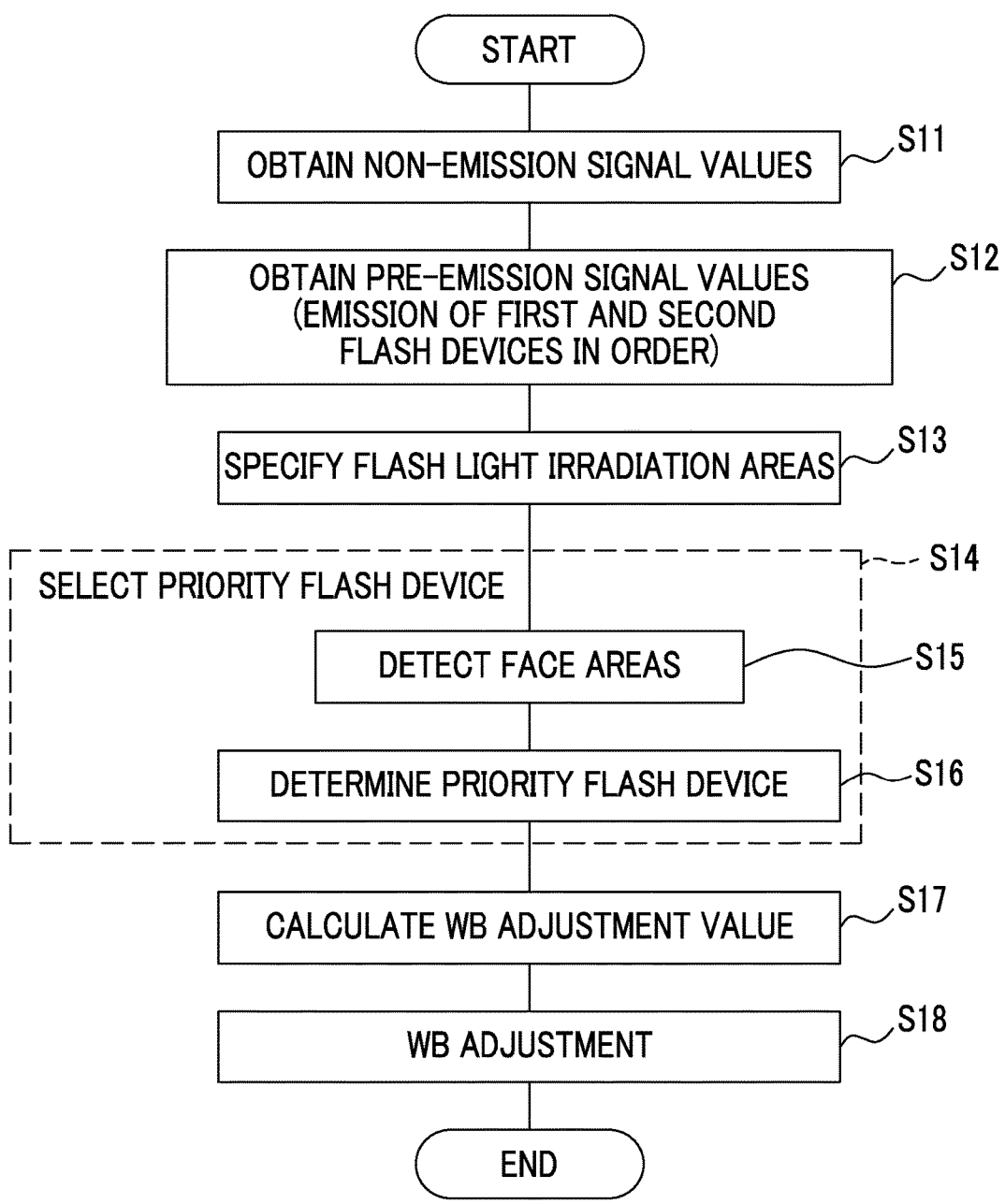
FIG. 4 is a flowchart showing WB adjustment in imaging using a plurality of flash devices.

FIG. 4 is a flowchart showing the WB adjustment in the multi-illumination imaging mode. Initially, in non-emission signal value obtaining step S11, non-emission images 60 (see FIG. 5(2)) which are images of the subjects 5 (see FIG. 1) are captured by the imaging element 28 and the non-emission image obtaining unit 53a of the image obtaining unit 53 in a state in which the flash devices 12 and 13 do not emit light. Non-emission signal values are obtained based on the non-emission images 60.

Figure 5:
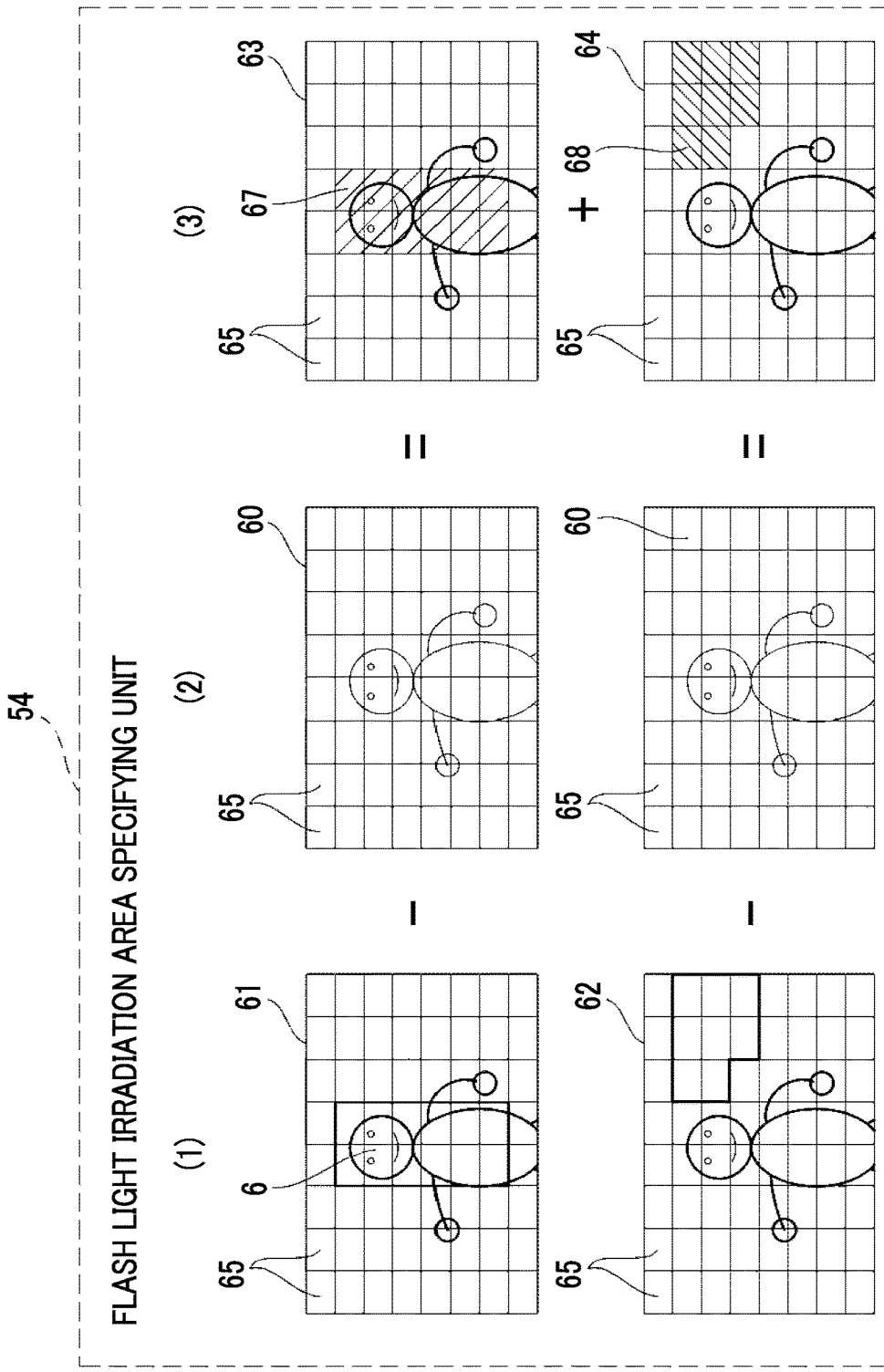
FIG. 5 is an explanatory diagram showing the specification of flash light irradiation areas.

In pre-emission signal value obtaining step S12, pre-emission images 61 and 62 (see FIG. 5(1)) which are images of the subjects 5 are captured by the imaging element 28 and the emission image obtaining unit 53b in a state in which the flash devices 12 and 13 do not individually emit light (individual emission states, see FIGS. 1 and 7), and emission signal values are obtained based on the pre-emission images 61 and 62. In this case, the illumination controller 52 controls the turning-on timings and light amounts of the flash devices 12 and 13 through the flash controller 30 or the wireless communication I/F 15. The emission image obtaining unit 53b selectively turns on the flash devices 12 and 13, and obtains the pre-emission image 61 or 62 which is the image of the subjects individually irradiated with the flash light.

FIG. 1 shows a state in which the first flash device 12 is turned on at the time of imaging in the studio. The first flash device 12 is set so as to irradiate the main subject 6 who stands in front of the backdrop 7 with the flash light. In this state, the first pre-emission image 61 (see FIG. 5(1)) which is the pre-emission image at the time of emission of first flash light is captured.

FIG. 7 shows a state in which the second flash device 13 is turned on. The second flash device 13 is set so as to irradiate the backdrop 7 which is present on the back of the main subject 6 with second flash light from above on the right side. In this state, the second pre-emission image 62 (see FIG. 5(1)) which is the pre-emission image at the time of emission of second flash light is captured.

In FIG. 4, in flash light irradiation area specifying step S13, flash light irradiation areas irradiated with the flash light from each flash device 12 or 13 are specified by the flash light irradiation area specifying unit 54.

FIG. 5 is an explanatory diagram showing a flash light irradiation area specifying process of the flash light irradiation area specifying unit 54 in flash light irradiation area specifying step S13. In the flash light irradiation area specifying process, flash light irradiation area specifying images 63 and 64 are created by using the non-emission images 60 and the pre-emission images 61 and 62.

For example, the non-emission images 60 and the pre-emission images 61 and 62 are initially divided into 8×8 rectangular division areas 65. The division areas 65 are obtained by dividing the non-emission images 60 and the pre-emission images 61 and 62 so as to have the same sections. The number of sections or the shape of the section are not limited to the illustrated example, and may be appropriately changed. Subsequently, a difference is obtained for each division area 65 by subtracting a brightness value Y0 of each division area 65 obtained from the non-emission image 60 from a brightness value Ya of each division area 65 obtained from the first pre-emission image 61. In a case where the difference of each division area is larger than those of the other division areas 65, a set of division areas 65 of which the difference is large is specified as first flash light irradiation areas 67.

In obtaining the non-emission image 60 and the first pre-emission image 61, imaging is obtained with a uniform exposure (with the same exposure) at the time of imaging the images 60 and 61. Alternatively, instead of using the uniform exposure, a brightness value of the other one of the non-emission image 60 and the first pre-emission image 61 in relation to a brightness value of one of the images may be corrected based on exposure differences at the time of imaging the images 60 and 61, and the exposure differences may be corrected through signal processing.

Similarly, a difference is obtained for each division area 65 based on a brightness value Yb of each division area 65 obtained from the second pre-emission image 62 of the second flash device 13 and a brightness value Y0 of each division area 65 obtained from the non-emission image 60, and a set of division areas 65 of which the difference is larger than those of the other division areas 65 is specified as second flash light irradiation areas 68. In this case, pre-processing for uniformly adjusting the exposures at the time of obtaining both the images 60 and 62 or post-processing for correcting the brightness value of the other one of both the images 60 and 62 in relation to the brightness value of both the images based on the exposure differences at the time of imaging both the images 60 and 62 is also performed.

For example, the brightness values Ya, Yb, and Y0 are obtained by calculating the brightness values of pixels from the following brightness conversion expression by using signal values R, G, and B of the pixels within each division area.

$$Y=0.3R+0.6G+0.1B$$

Subsequently, an average brightness value obtained by averaging the brightness values of the pixels within each division area calculated by the aforementioned brightness conversion expression is calculated. For example, a value to be used is not limited to the aforementioned brightness value as long as the value is a value representing the brightness of each division area, and lightness V in the HSV color space or lightness L in the Lab color space may be used.

On the first pre-emission image 61, the main subject 6 is positioned in the center, and the main subject 6 is mainly irradiated with the flash light (first flash light) from the first flash device 12. Thus, the flash light irradiation areas (first flash light irradiation areas) 67 irradiated with the first flash light are specified as represented as hatched portions on the flash light irradiation area specifying image 63.

On the second pre-emission image 62 of the second flash device 13, the flash light irradiation areas (second flash light irradiation areas) 68 using the second flash device 13 are also specified similarly to the specification of the first flash light irradiation areas 67. On the second pre-emission image 62, since the backdrop 7 is irradiated with the second flash light as shown in FIG. 7, the second flash light irradiation areas 68 are specified as represented as the hatched portions on the flash light irradiation area specifying image 64.

In FIG. 4, in priority flash device selecting step S14, the priority flash device of the flash devices 12 and 13 is selected as a target of the WB adjustment by the priority flash device selecting unit 55. Priority flash device selecting step S14 includes face area detecting step S15 using the face area detecting unit 57 and priority flash device determining step S16 using the priority flash device determining unit 58.

Figure 6:
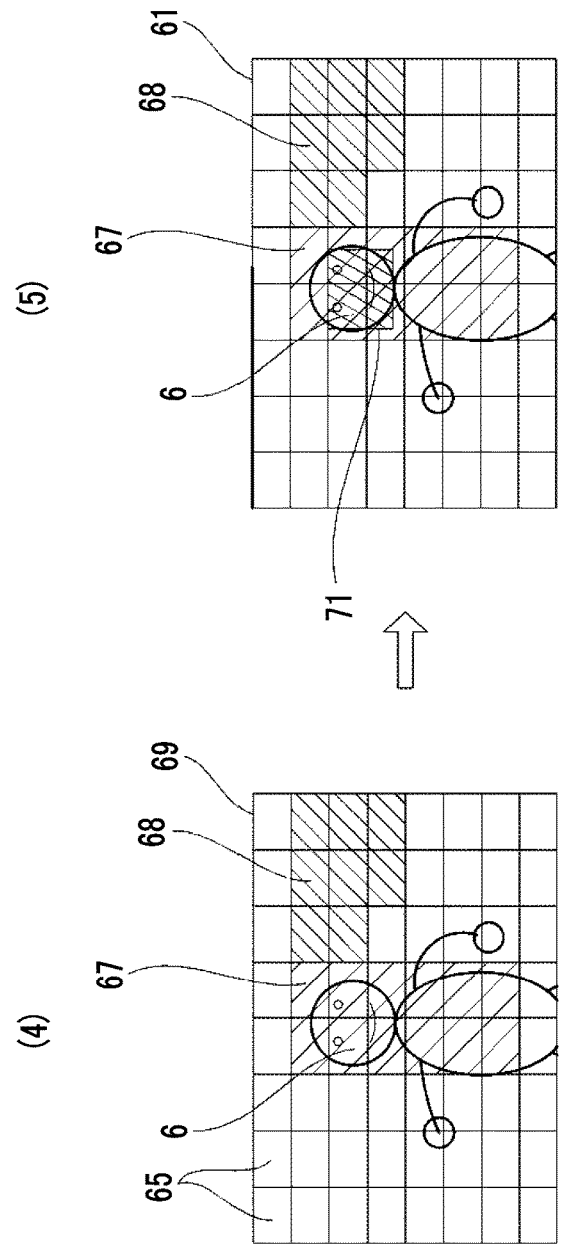
FIG. 6 is an explanatory diagram showing the selection of a priority flash device.

FIG. 6 is an explanatory diagram showing the priority flash device selecting process of the priority flash device selecting unit 55 in priority flash device selecting step S14. Initially, the face area detecting unit 57 detects face areas 71 of a person from the first pre-emission image 61 as shown in FIG. 6(5) (face area detecting step S15). It is preferable that the division areas (division areas smaller than the division areas 65 by increasing the number of divisions) having the size smaller than that of the division areas 65 used at the time of obtaining the flash light irradiation areas 67 and 68 are used in the detection of the face areas 71. The face areas 71 may be detected from the non-emission image 60 or the second pre-emission image 62.

The priority flash device determining unit 58 specifies which of the flash light irradiation areas 67 and 68 the face areas 71 detected by the face area detecting unit 57 are present, and determines the flash light irradiation areas in which the face areas 71 are present as priority flash light irradiation areas. More specifically, the priority flash device determining unit obtains information of which of the first flash light irradiation areas 67 and the second flash light irradiation areas 68 the detected face areas 71 are present from coordinates representing the mutual positions of these areas on the image. In a case where the face areas 71 are present in the first flash light irradiation areas 67, the first flash device 12 which is an emission source of the first flash light is automatically specified as the flash device to which the priority is to be given in the WB adjustment (priority flash device determining step S16).

The face areas 71 are detected based on areas indicating the flesh color of the person. In addition, the face areas 71 may be detected by a method using shape recognition of eyes, nose, and mouth, a method using combination of the flesh color area and the shape recognition, or various face recognition methods.

In the present embodiment, it is possible to specify the priority flash device by automatically detecting the face areas 71.

A subject image 69 shown in FIG. 6(4) is displayed such that the density of hatching varies depending on the average brightness values of the flash light irradiation areas 67 and 68, for example, the higher the brightness values, the higher the density of hatching. Through such a display, it is determined for the subject image 69 that the brightness of the second flash light irradiation areas 68 including mainly the backdrop 7 is higher than that of the first flash light irradiation areas 67 including the main subject 6. In a case where the brightness of the second flash light irradiation areas 68 is high as stated above, the WB adjustment is performed based on the pixels of the second flash light irradiation areas 68 of which the brightness is high in an automatic WB process in the multi-illumination imaging mode of the related art. Accordingly, since the WB adjustment is performed based on the pixels of the backdrop 7, the main subject 6 is shifted from an original tint.

In contrast, in the first embodiment, the first flash device 12 is selected as the priority flash device by automatically detecting the main subject 6 as shown in FIG. 6(5) in priority flash device determining step S16. The WB adjustment value is obtained based on the first flash light irradiation areas 67 including the main subject 6. The WB adjustment is performed by using the WB adjustment value, and thus, the main subject 6 can have an appropriate tint.

The WB process is performed in the WB adjusting unit 56 of the digital signal processing unit 35. The WB adjustment value calculating unit 59 of the WB adjusting unit 56 obtains the WB adjustment value by performing WB adjustment value calculating step S17 shown in FIG. 4.

WB adjustment value calculating step S17 is performed as follows. Initially, it is assumed that a distribution of brightness values of (i×j) number of divided blocks (division areas 65, i and j=1 to 8 in the present example) at the time of emitting only the priority flash light is Ypre(i, j) and a distribution of brightness values at the time of the non-emission of the flash light which is only the ambient light is Y0(i, j). Here, a distribution ΔYpre(i, j) of brightness values increased by the priority flash light is obtained by the following expression.

$$\Delta Ypre(i,j) = Ypre(i,j) - Y0(i,j)$$

The imaging is performed at the time of actual emission for performing actual imaging by emitting light with an emission amount which is k times an emission amount at the time of pre-emission which is individual emission for obtaining the flash light irradiation areas. K times are determined by the dimming result of the camera or the setting of the user. In this case, in a case where brightness values are increased by only the priority flash light at the time of actual emission, a distribution ΔYpre(i, j) of brightness values to be expected is obtained by the following expression.

$$\Delta Yexp(i,j) = K \times \Delta Ypre(i,j)$$

In a case where it is assumed that the main subject is irradiated with only the priority flash light at the time of the actual emission of the light with the emission amount which is K times the emission amount at the time of pre-emission, a distribution (actual-emission priority auxiliary light signal prediction value) Yexp(i, j) of brightness values to be expected is obtained by the following expression. Although the main subject is actually irradiated with the other flash, since the influence of the other flash is less, the irradiation with the other flash is excluded.

$$Yexp(i,j) = \Delta Yexp(i,j) + Y0(i,j) = K \times \Delta Ypre(i,j) + Y0(i,j)$$

In a case where it is assumed that representative values obtained by calculating values within the areas irradiated with the priority flash light through a process such as averaging in the distributions Yexp(i, j) and Y0(i, j) of the brightness values are Yexp#type and Y0#type, α indicating a ratio of the brightness values using the flash light to the brightness values in the areas irradiated with the priority flash light is obtained by the following expression.

$$\alpha = (Yexp\#type - Y0\#type) / Yexp\#type$$

Y0#type corresponds to a signal value at the time of the non-emission of the priority auxiliary light irradiation areas.

In a case where it is assumed that the WB adjustment value of the ambient light is G0 and the WB adjustment value at the time of emitting only the flash light recorded within the camera, a WB adjustment value Gwb to be obtained is obtained by the following expression.

$$Gwb = (Gfl - G0) \times \alpha + G0$$

At the time of actual emission, the subjects 5 are captured in a state in which both the first flash device 12 and the second flash device 13 emit light, and thus, the actual emission image is obtained. The WB adjusting unit 56 performs WB adjusting step S18 as shown in FIG. 4, and adjusts WB by multiplying the signal values R, G, and B of the actual emission image by the WB adjustment value Gwb. Accordingly, a light source color is canceled. The WB adjustment value Gwb is not limited to the aforementioned method, and may be obtained by various methods.

In the present embodiment, since the priority flash device is automatically determined based on the main subject 6 and the WB adjustment is performed based on the priority flash device, the main subject 6 can have the appropriate tint at the time of imaging using a plurality of flash light rays.

Although it has been described in the aforementioned embodiment that one priority flash device is used, the WB adjustment value Gwb is obtained as follows in a case where a plurality of flash devices determined as the priority flash devices is used.

For example, in a case where two priority flash devices are used and it is initially assumed that distributions of brightness values of (i×j) number of divided blocks at the time of individually emitting first priority flash light and second priority flash light are Ypre1(i, j) and Ypre2(k, j) and a distribution of brightness values at the time of non-emission (=only the ambient light) is Y0(i, j), distributions ΔYpre1(i, j) and ΔYpre2(i, j) of brightness values increased by the first and second priority flash light rays are respectively obtained by the following expressions.

$$\Delta Ypre1(i,j) = Ypre1(i,j) - Y0(i,j)$$

$$\Delta Ypre2(i,j) = Ypre2(i,j) - Y0(i,j)$$

In a case where the brightness values are increased by only the first priority flash light and the second priority flash light at the time of actual emission, the distribution ΔYexp(i, j) of the brightness values to be expected is obtained as follows. K1 is obtained from (emission amount at the time of actual emission)/(emission amount at the time of pre-emission) of the first priority flash light, and K2 is obtained from (emission amount at the time of actual emission)/(emission amount at the time of pre-emission) of the second priority flash light.

$$\Delta Yexp(i,j) = K1 \times \Delta Ypre1(i,j) + K2 \times \Delta Ypre2(i,j)$$

Similarly to the case where one priority flash device is used, the distributions of the brightness values Yexp(i, j) and Y0(i, j) to be expected, the representative values of the areas irradiated with the priority flash light Yexp#type and Y0#type, α indicating a ratio of the brightness values using the priority flash light to the brightness values in the priority flash light irradiation areas, and so on are calculated based on the distribution ΔYexp(i, j) of the brightness values corresponding to the obtained increase amount, and the WB adjustment value Gwb is ultimately obtained. The WB adjustment is performed based on the WB adjustment value Gwb as described above.

Since the face areas are detected from the non-emission image or the emission image by the face area detecting unit 57 and the flash device corresponding to the flash light irradiation areas including the face areas is determined as the priority flash device, the face of the person which is the main subject 6 can have the appropriate tint.

Second Embodiment

As shown in FIG. 8, there are some cases where imaging is performed in the studio by attaching a special effect filter 80 to an irradiation surface of the flash device 13 and projecting a color or a pattern on the background. There are many cases where commemorative images are captured on the seasons of the year and occasions, and the special effect filter 80 is used such that a background color varies depending on each season of the year or each occasion. For example, in a case where an image commemorative of entrance into a school is captured in a school entrance ceremony on April, the special effect filter 80 for giving an effect such that the background is in pink or the special effect filter 80 for giving an effect such that cherry blossoms are scattered is used in order to express cherry blossoms in full bloom. The priority flash device in the imaging in the studio using the special effect filter 80 may be automatically selected by excluding the flash device for background. In the following embodiments, the same components as those of the first embodiment will be assigned the same references, and the redundant description thereof will be omitted.

Figure 9:
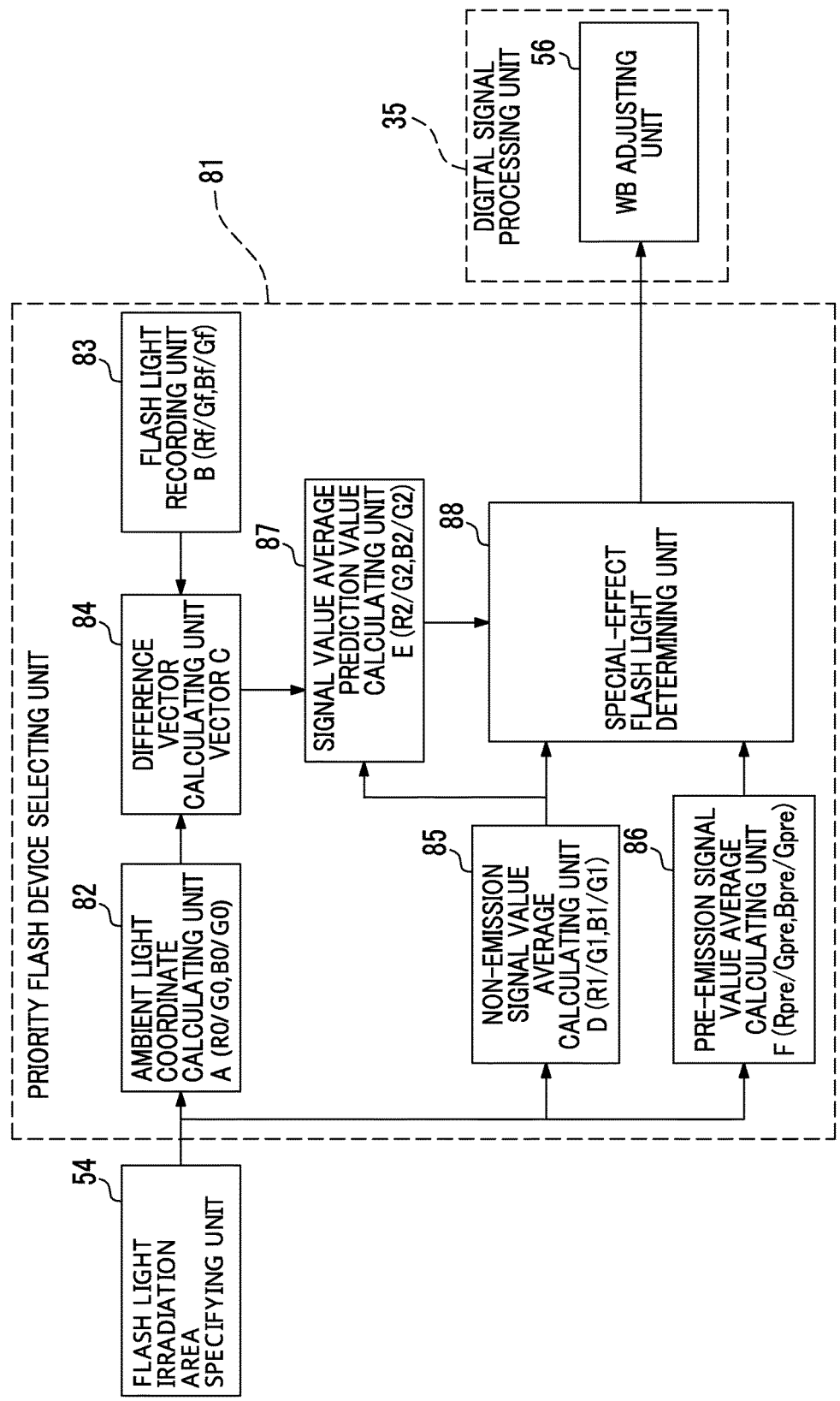
FIG. 9 is a functional block diagram showing a priority flash device selecting unit of the second embodiment.

In the second embodiment, a priority flash device selecting unit 81 includes an ambient light coordinate calculating unit 82 that calculates the coordinates of the ambient light, a flash light recording unit 83, a difference vector calculating unit 84, a non-emission signal value average calculating unit 85 that calculates the average of the signal values at the time of the non-emission of the flash light irradiation areas, a pre-emission signal value average calculating unit 86 that calculates the average of the signal values at the time of the pre-emission of the flash light irradiation areas, a signal value average prediction value calculating unit 87, and a special-effect flash light determining unit 88, as shown in FIG. 9. The priority flash device selecting unit 81 identifies that the flash light is the flash light using the special effect filter 80, excludes the flash device that emits the flash light using the special effect filter 80 from the priority flash device, and selects the remaining flash device as the priority flash device.

Figure 10:
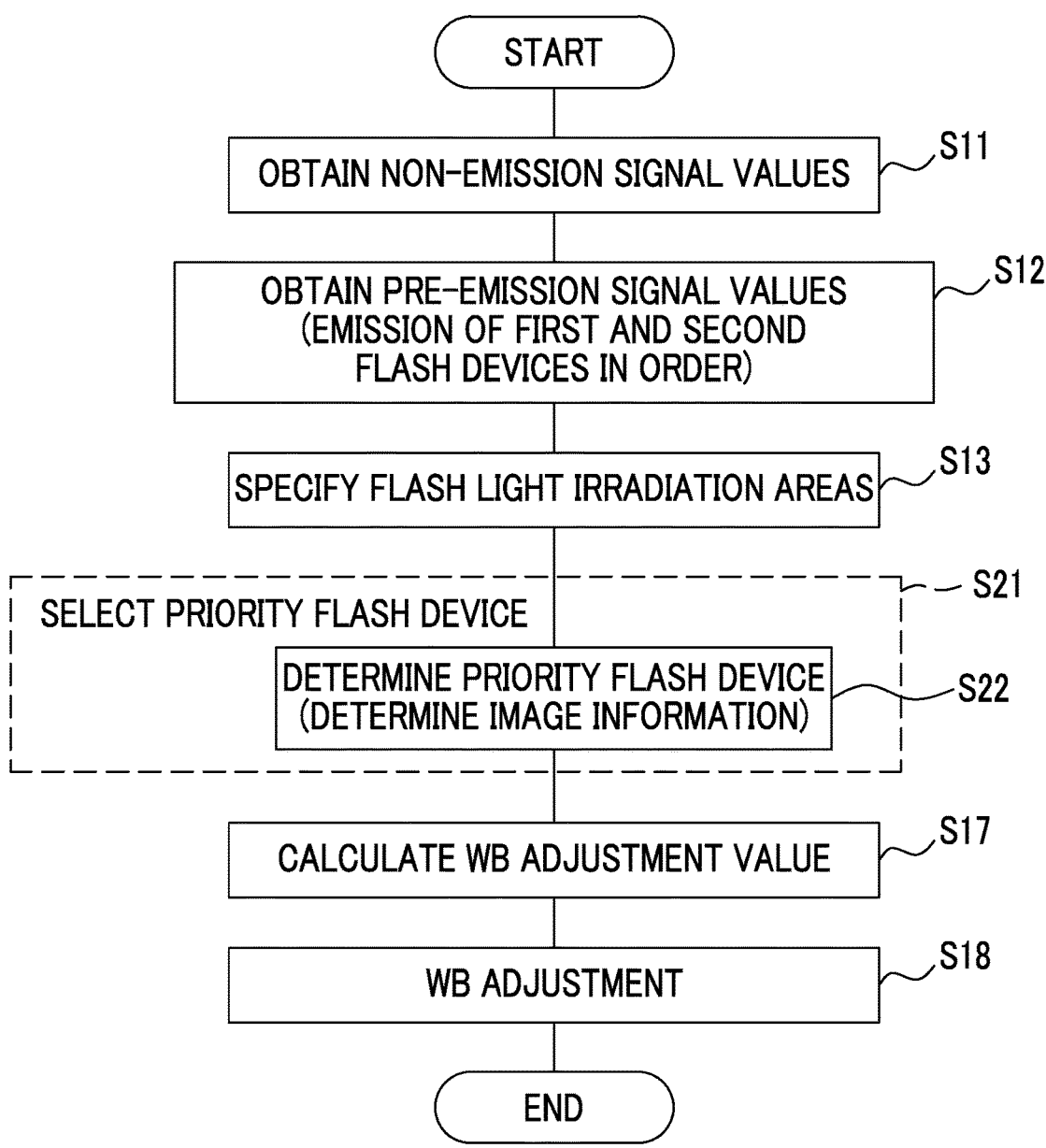
FIG. 10 is a flowchart showing WB adjustment according to the second embodiment.

FIG. 10 is a flowchart showing a process procedure according to the second embodiment. Non-emission signal value obtaining step S11, pre-emission signal value obtaining step S12, flash light irradiation area specifying step S13, WB adjustment value calculating step S17, and WB adjusting step S18 are the same processes as those of the first embodiment, and only priority flash device selecting step S21 is different. Priority flash device selecting step S21 includes priority flash device determining step S22 of determining the priority flash device through the determination of the image information.

Figure 11:
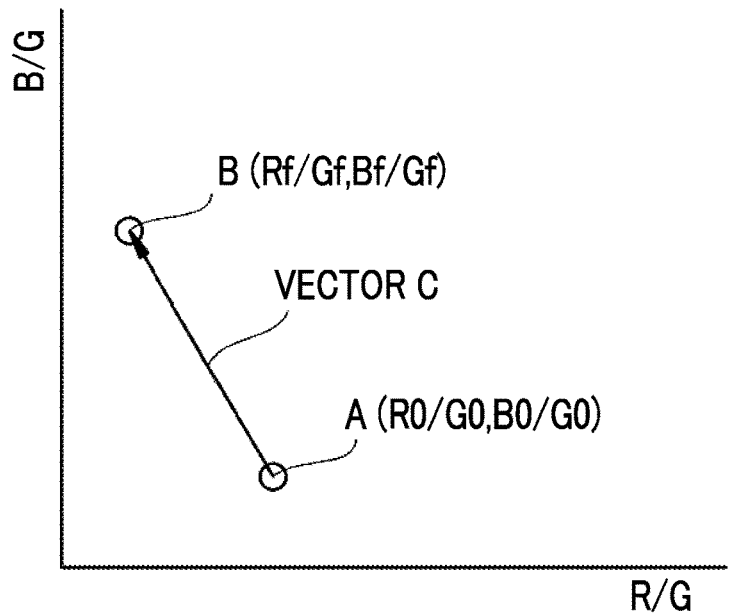
FIG. 11 is a diagram showing light source color information of ambient light, light source color information of flash light, and a difference vector in a color space having R/G and B/G on a coordinate axis.

In priority flash device determining step S22, light source coordinates (R0/G0, B0/G0) at a point A representing light source color information of the ambient light in a color space having R/G and B/G on a coordinate axis are calculated based on the signal value of the non-emission image by the ambient light coordinate calculating unit 82, as shown in FIG. 11.

Subsequently, light source coordinates (Rf/Gf, Bf/Gf) at a point B representing the light source color information of the flash light in the same color space are calculated in advance, and are stored in a nonvolatile memory by the flash light recording unit 83. Subsequently, a vector C which is a difference therebetween is calculated based on the coordinates (R0/G0, B0/G0) at the point A and the coordinates (Rf/Gf, Bf/Gf) at the point B by the difference vector calculating unit 84. The vector C is output to the signal value average prediction value calculating unit 87.

Figure 12:
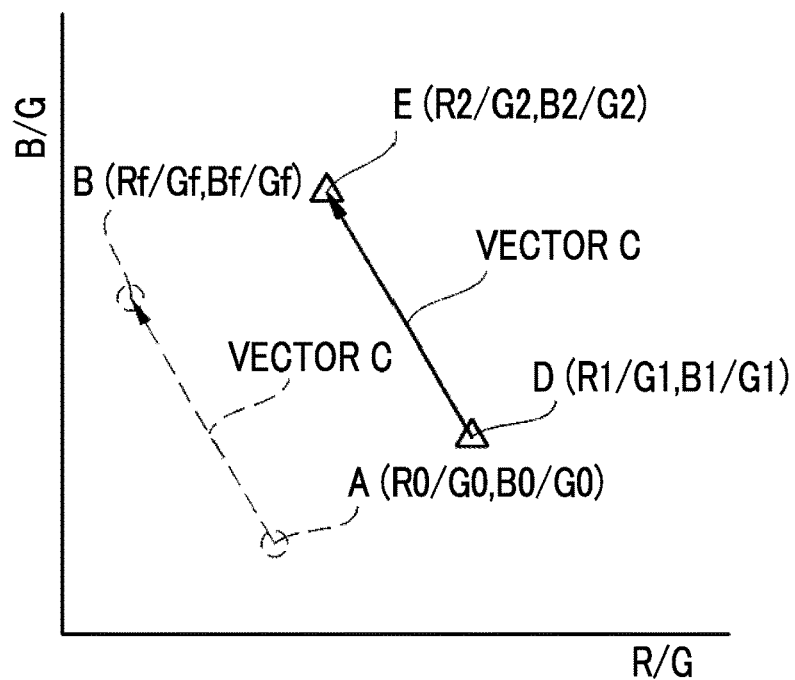
FIG. 12 is a diagram showing a signal value average at the time of non-emission of each flash light irradiation areas and a signal value average prediction value at the time of performing irradiation using flash light in a state in which there is no special effect filter in the color space having R/G and B/G on the coordinate axis.

Subsequently, signal value averages R1, G1, and B1 (corresponding to the pixel information at the time of the non-emission of the auxiliary light irradiation areas) at the time of the non-emission of the flash light irradiation areas are calculated, and coordinates (R1/G1, B1/G1) at a point D in the color space are calculated by the non-emission signal value average calculating unit 85, as shown in FIG. 12. The coordinates (R1/G1, B1/G1) at the point D are output to the signal value average prediction value calculating unit 87 and the special-effect flash light determining unit 88.

Subsequently, coordinates (R2/G2, B2/G2) at a point E in the color space which indicate prediction values R2, G2, and B2 of the signal value averages at the time of performing the irradiation using only the flash light in a state in which there is no special effect filter 80 and there is no ambient light in the same flash light irradiation areas are calculated from the following expression by the signal value average prediction value calculating unit 87. Here, the prediction values R2, G2, and B2 correspond to the signal value average prediction values at the time of the emission of the auxiliary light source.

$$(R2/G2, B2/G2) = (R1/G1, B1/G1) + C$$

Figure 13:
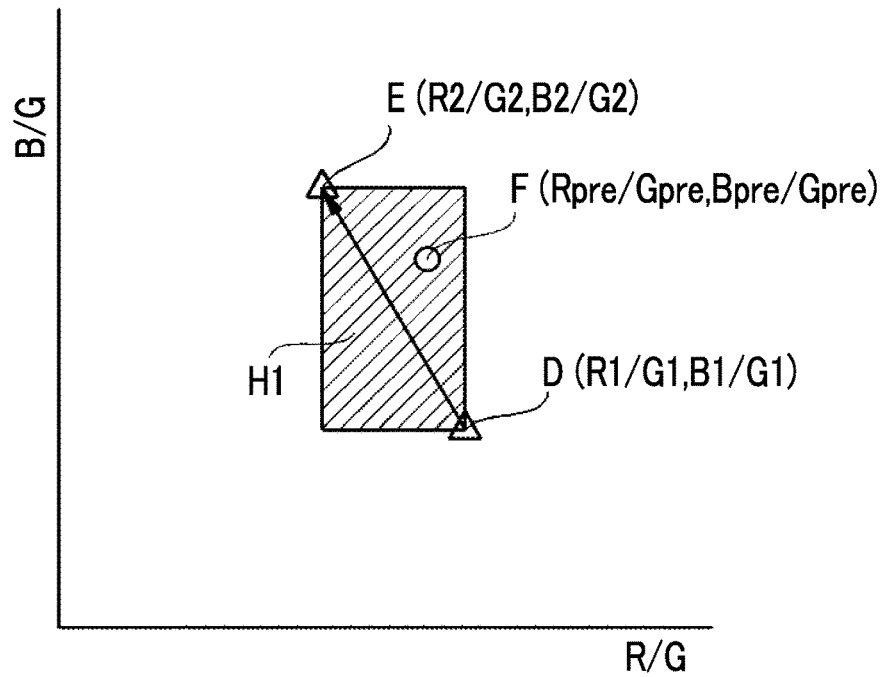
FIG. 13 is a diagram showing the determination of whether or not the flash device is a flash device to which the special effect filter is attached based on whether or not a signal value average at the time of pre-emission is present in a determination range H1 in the color space having R/G and B/G on the coordinate axis.

Subsequently, signal value averages Rpre, Gpre, and Bpre (corresponding to pixel information based on the emission image) in the flash light irradiation areas of the pre-emission image are obtained by the pre-emission signal value average calculating unit 86, and coordinates (Rpre/Gpre, Bpre/Gpre) at a point F in the color space which indicate the signal value averages Rpre, Gpre, and Bpre at the time of the pre-emission are calculated as shown in FIG. 13. The coordinates (Rpre/Gpre, Bpre/Gpre) at the point F are output to the special-effect flash light determining unit 88.

Thereafter, the special-effect flash light determining unit 88 determines whether or not the flash light is the flash light using the special effect filter 80 based on the coordinates (Rpre/Gpre, Bpre/Gpre) at the point F. In a case where the coordinates (Rpre/Gpre, Bpre/Gpre) at the point F are present in a rectangular determination range H1 using the point D indicated by the non-emission signal value average coordinates (R1/G1, B1/G1) and the point E indicated by the flash-emission signal value average prediction value coordinates (R2/G2, B2/G2) as both ends of a diagonal line, the special-effect flash light determining unit 88 determines that the flash light is the normal flash light (color temperature: 5000 to 6000K) without using the special effect filter 80. In contrast, in a case where the coordinates (Rpre/Gpre, Bpre/Gpre) at the point F are present in the determination range H1, it is determined that the flash device is the flash device to which the special effect filter 80 is attached. Accordingly, in a case where the flash device is the flash device to which the special effect filter 80 is attached, the flash device is excluded from the priority flash device. Therefore, it is determined that the remaining flash device is the priority flash device.

For example, in a case where there is the plurality of flash devices determined as the priority flash devices, it is determined that the flash device having a high brightness value average of the flash light irradiation areas is the priority flash device. It is determined that the flash device having a high light amount set ratio of the user is the priority flash device. It may be determined that the plurality of flash devices is the priority flash devices instead of the selecting any one thereof as stated above.

Since the flash device that emits the flash light using the special effect filter 80 is excluded from the priority flash device and the remaining flash device is selected as the priority flash device, the flash device that emits the flash light using the special effect filter 80 frequently used as the illumination of the background is excluded from the priority flash device, and the flash device that outputs the flash light to the main subject 6 such as the person is selected as the priority flash device. Accordingly, the main subject 6 can have the appropriate tint.

Modification Example 1

Figure 14:
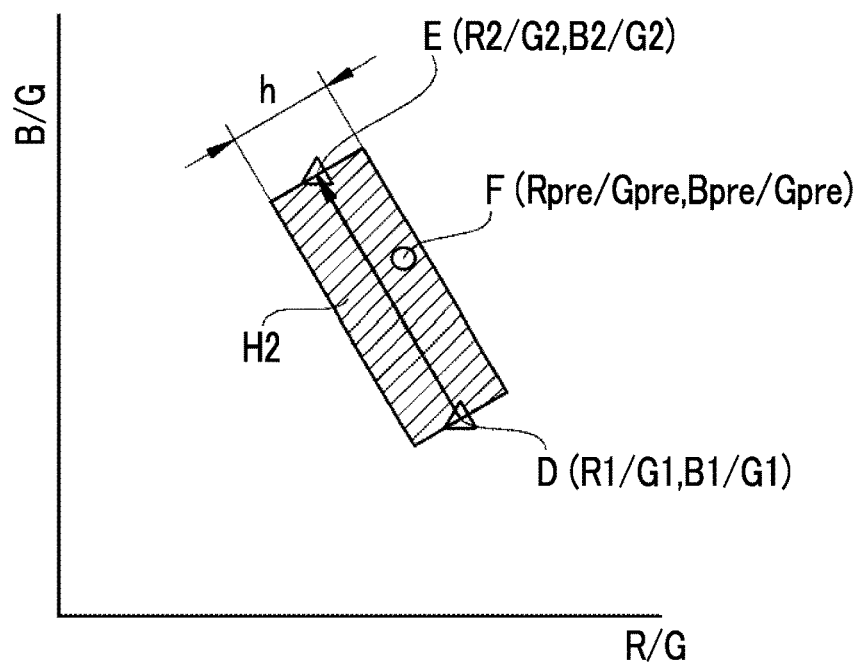
FIG. 14 is a diagram showing a determination range H2 according to Modification Example 1.

Although it has been described in the second embodiment that the rectangular determination range H1 is used as shown in FIG. 13, a rectangular determination range H2 defined by a width h in a direction perpendicular to a line segment that connects the point D with the point E is used in Modification Example 1 shown in FIG. 14. For example, as a length which is 30% of a length of the line segment DE is used as the width h. Specifically, the width h is set to a value with which WB performance is the best.

Modification Example 2

Figure 15:
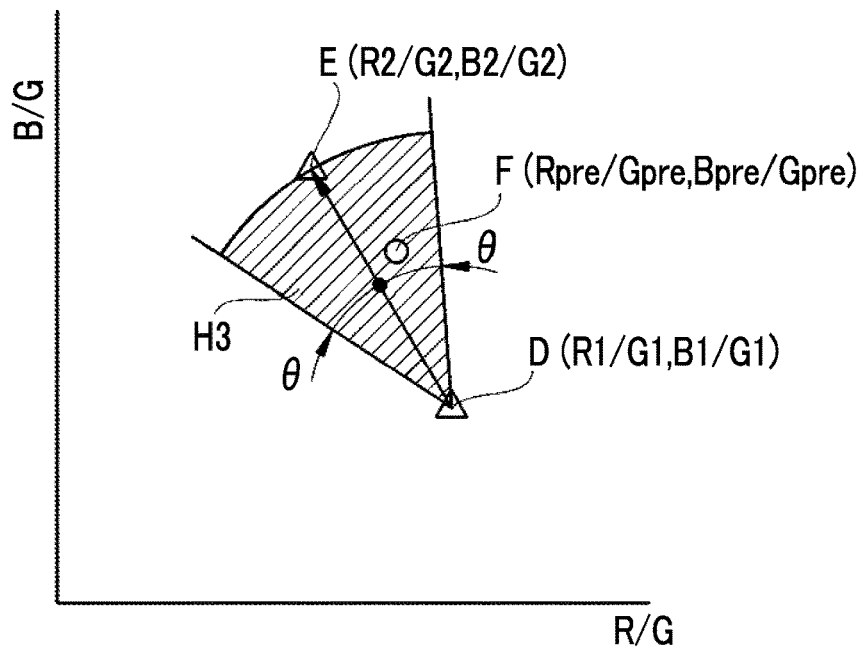
FIG. 15 is a diagram showing a determination range H3 according to Modification Example 2.

In Modification Example 2 shown in FIG. 15, a sector-shaped (fan-shaped) determination range H3 divided up by a predetermined angle θ with respect to the line segment that connects the point D with the point E with the point D as a reference is used. The angle θ is set to a value with which the WB performance is the best.

Modification Examples 3 to 5

Figure 16:
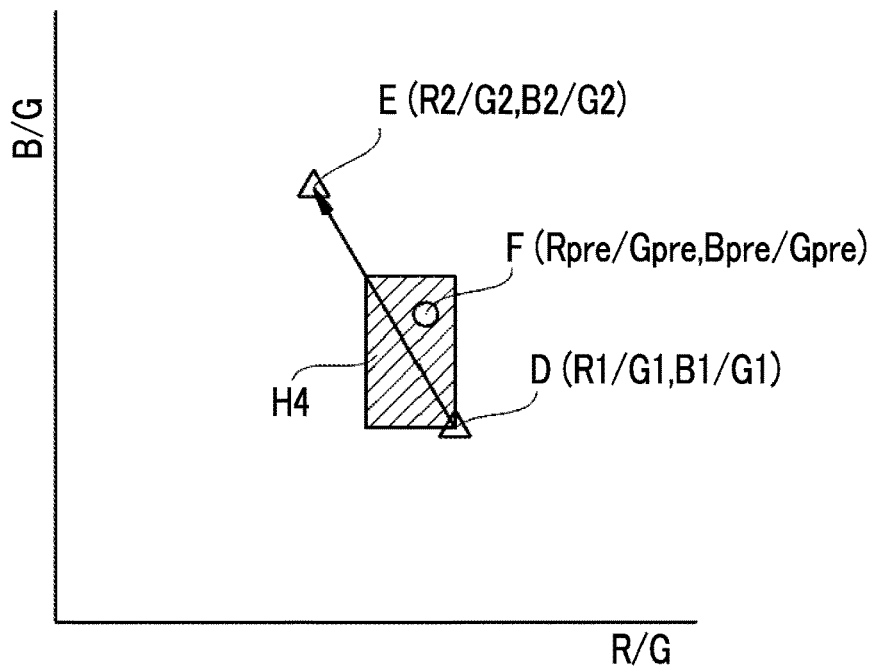
FIG. 16 is a diagram showing a determination range H4 according to Modification Example 3.
Figure 17:
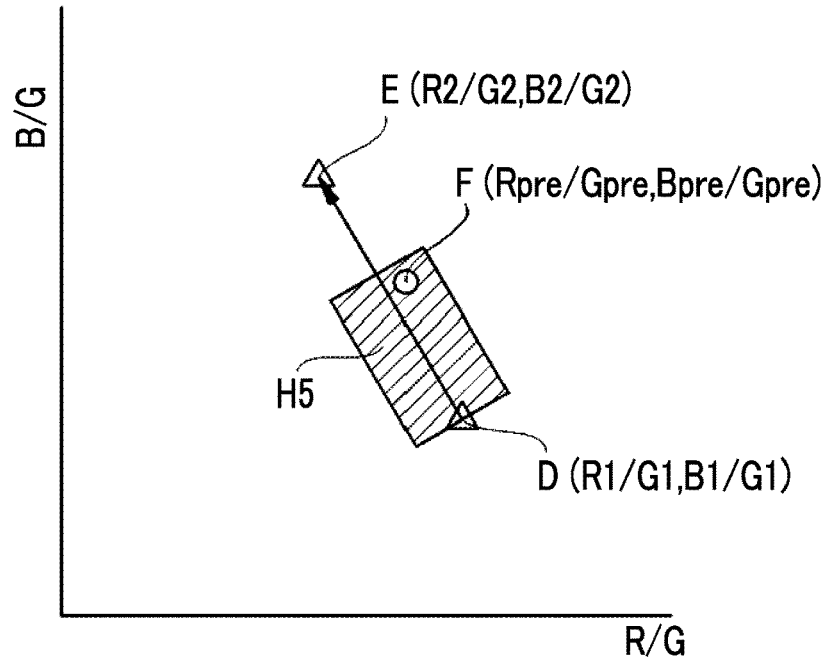
FIG. 17 is a diagram showing a determination range H5 according to Modification Example 4.
Figure 18:
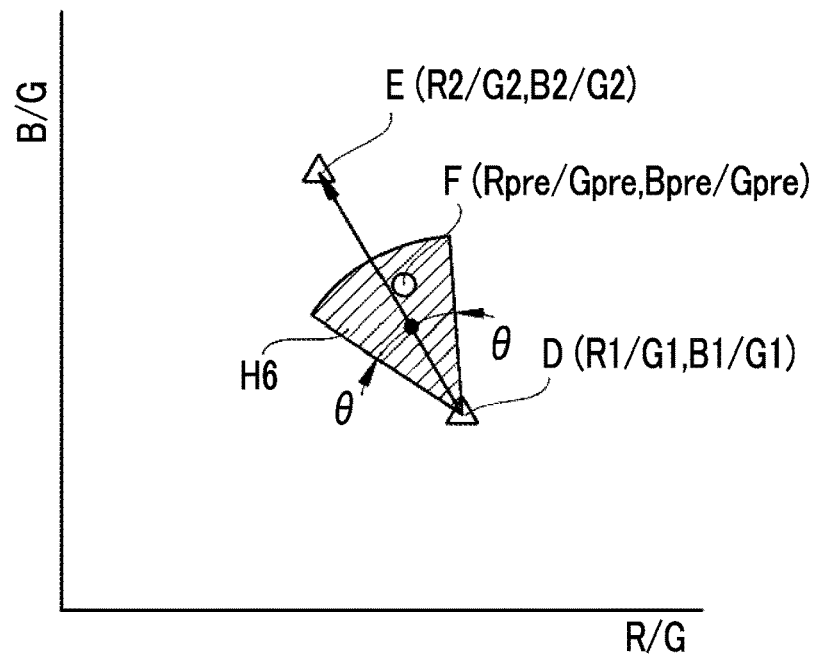
FIG. 18 is a diagram showing a determination range H6 according to Modification Example 5.

In Modification Example 3 shown in FIG. 16, a determination range H4 obtained by multiplying the vector C by a reduction ratio β (β<1) and further reducing the length than the vector C in the determination range H1 shown in FIG. 13 is used. Similarly, in Modification Example 4 shown in FIG. 17, a determination range H5 obtained by multiplying the length of the line segment DE by the reduction ratio β and further reducing the length than the line segment DE in the determination range H2 of Modification Example 1 shown in FIG. 14 is used. Similarly, in Modification Example 5 shown in FIG. 18, a sector-shaped determination range H6 obtained by multiplying the length of the line segment DE by the reduction ratio β and further reducing the length than the line segment DE in the determination range H3 of Modification Example 2 shown in FIG. 15 is used.

The reduction ratio β is obtained by the following expression.

$$\beta = (Ypre - Y0)/Ypre$$

Ypre is a brightness value average at the time of the pre-emission of the flash light irradiation areas, and Y0 is similarly a brightness value average at the time of the non-emission of the flash light irradiation areas. For example, it is preferable that a margin is given to the reduction ratio β by using a value β1 (=β×1.2) obtained by multiplying β by 1.2.

As in Modification Examples 1 to 5, it is possible to more strictly determine whether or not the flash device is the flash device to which the special effect filter 80 is attached by obtaining the determination ranges H2 to H6 other than the determination range H1 shown in FIG. 13.

Although it has been described in the second embodiment that the flash device is determined as the priority flash device in a case where the emission signal value average is present in the range including a non-emission signal value average and a flash-light-emission signal value average prediction value as both ends, the second embodiment is not limited to this determination method. For example, the priority flash device may be determined based on the previously stored pixel information of the flash light.

Third Embodiment

Figure 19:
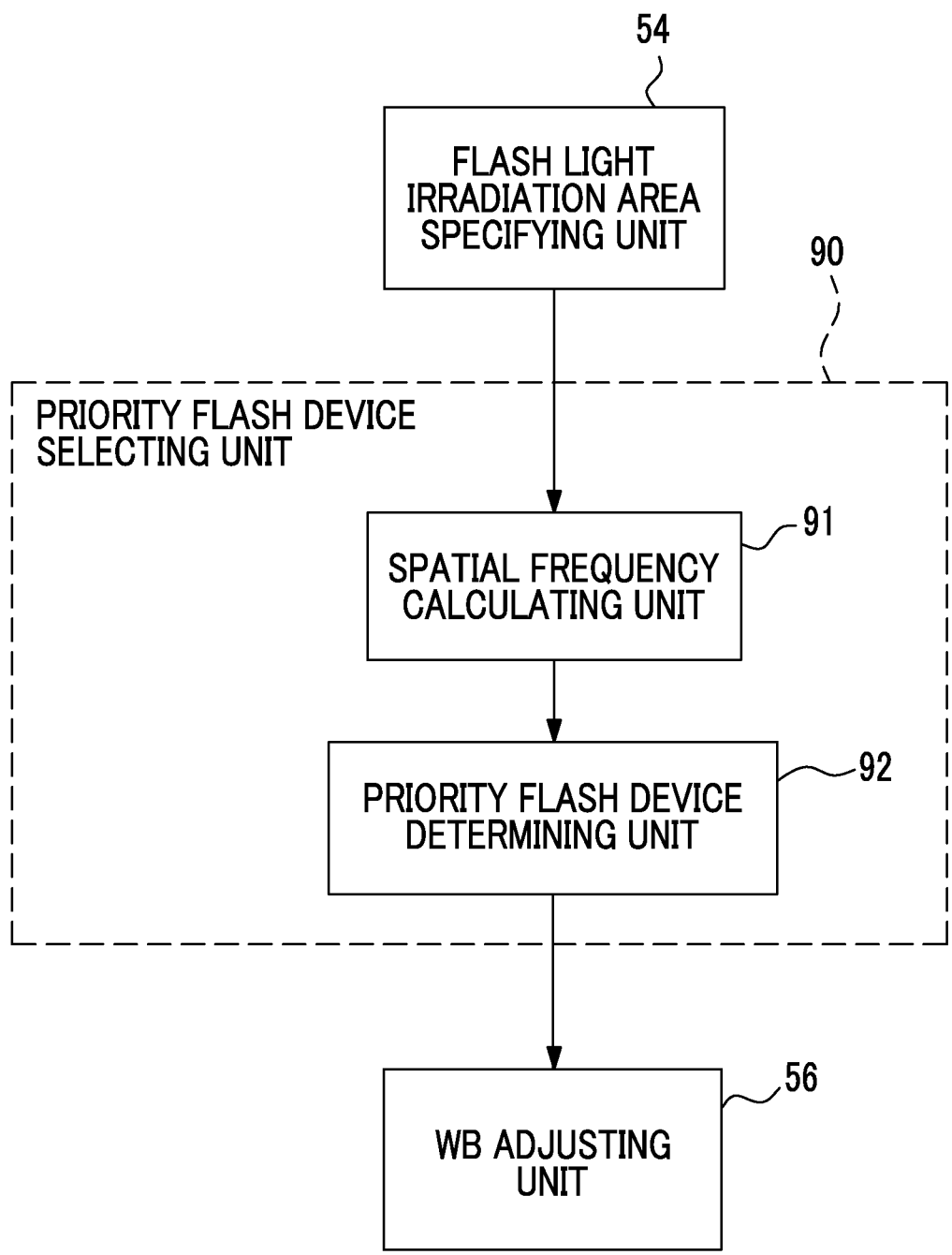
FIG. 19 is a functional block diagram showing a priority flash device selecting unit according to a third embodiment.

As shown in FIG. 19, in a third embodiment, a priority flash device selecting unit 90 as a priority auxiliary light source selecting unit includes a spatial frequency calculating unit 91 and a priority flash device determining unit 92, and the priority flash device determining unit 92 determines whether or not the flash device is the flash device that irradiates the background with the flash light based on the spatial frequency calculated by the spatial frequency calculating unit 91.

Figure 20:
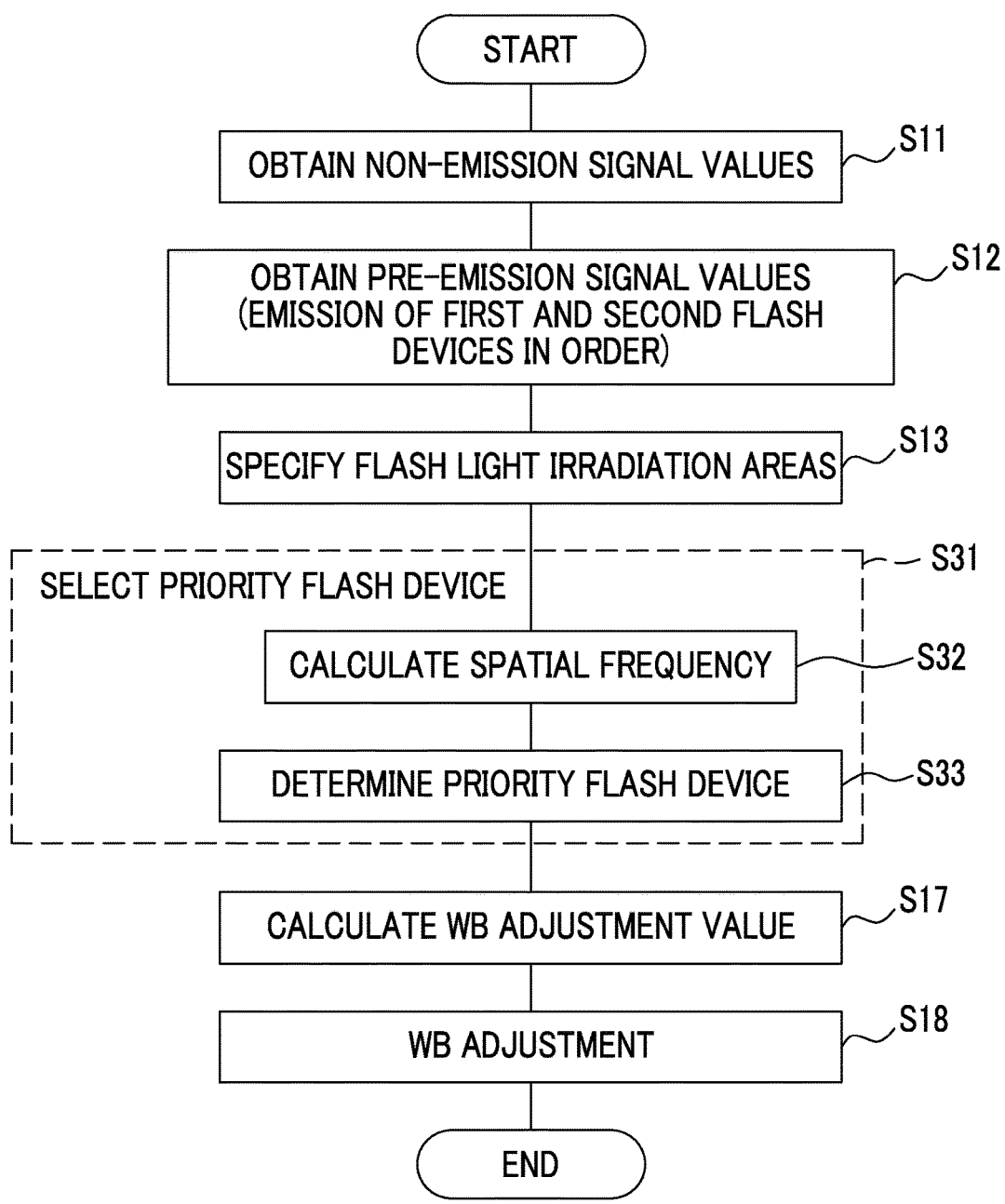
FIG. 20 is a flowchart showing WB adjustment according to the third embodiment.

FIG. 20 is a flowchart showing a process procedure according to a third embodiment. Non-emission signal value obtaining step S11, pre-emission signal value obtaining step S12, flash light irradiation area specifying step S13, WB adjustment value calculating step S17, and WB adjusting step S18 are the same processes as those of the first embodiment, and only priority flash device selecting step S31 is different.

In priority flash device selecting step S31, spatial frequency calculating step S32 is performed by the spatial frequency calculating unit 91. In spatial frequency calculating step S32, spatial frequencies of the flash light irradiation areas 67 and 68 on the non-emission images 60 using the flash devices 12 and 13 are calculated. Subsequently, priority flash device determining step S33 is performed by the priority flash device determining unit 92. In priority flash device determining step S33, in a case where the calculated spatial frequencies of the flash light irradiation areas 67 and 68 using the flash devices 12 and 13 are equal to or smaller than a predetermined value, the flash device corresponding to the flash light irradiation areas having the spatial frequency equal to or smaller than the predetermined value is excluded from a selection target of the priority flash device. There are many cases where the backdrop 7 is a plain screen, and there are some cases where the spatial frequency is equal to or smaller than the predetermined value. Accordingly, in the present example, the flash device 13 corresponding to the flash light irradiation areas 68 radiated to the backdrop 7 is excluded, and the flash device 12 corresponding to the flash light irradiation areas 67 remaining after the excluding is determined as the priority flash device. Accordingly, the flash device 12 is selected as the priority flash device. In a case where there is the plurality of flash devices remaining after the excluding, the flash device having a high brightness value average in the flash light irradiation areas is determined as the priority flash device. All the plurality of remaining flash devices may be determined as the priority flash devices instead of determining only one priority flash device.

Since the flash device corresponding to the flash light irradiation areas in which the spatial frequency is equal to or smaller than the predetermined value is excluded from the selection target of the priority flash device and the flash device remaining after the excluding is determined as the priority flash device, the flash device that irradiates the backdrop 7 is reliably excluded from the selection target of the priority flash device, and the flash device that irradiates the main subject 6 is selected as the priority flash device. Accordingly, the main subject 6 can have the appropriate tint.

Fourth Embodiment

Figure 21:
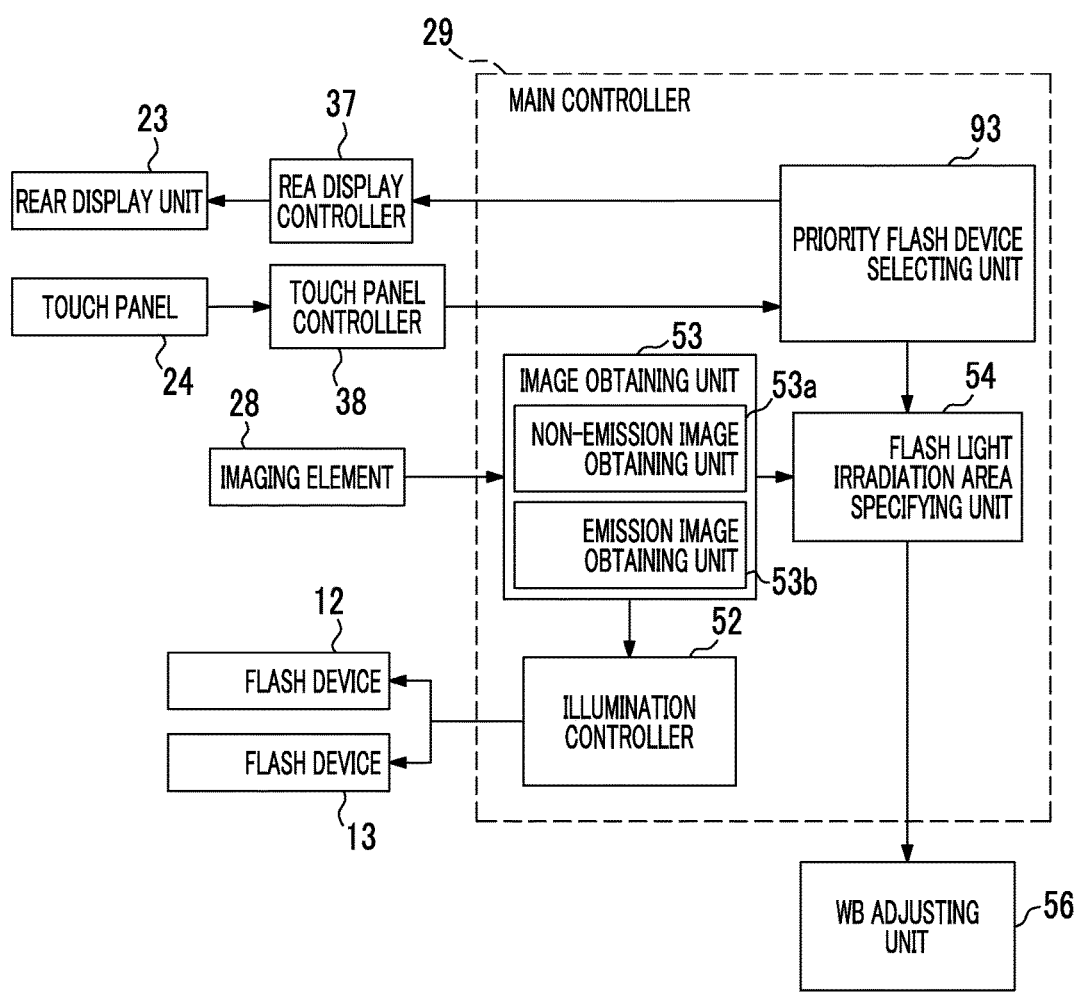
FIG. 21 is a functional block diagram showing a priority flash device selecting unit according to a fourth embodiment.

Although it has been described in the aforementioned embodiments that the priority flash device is automatically specified, a manual setting mode in which the priority flash device is manually set is able to be selected and the priority flash device is selected by the user in a fourth embodiment shown in FIGS. 21 to 24. As shown in FIG. 21, in the manual setting mode, the rear display unit 23 is controlled through the rear display controller 37 by a priority flash device selecting unit 93 of the main controller 29.

Figure 22:
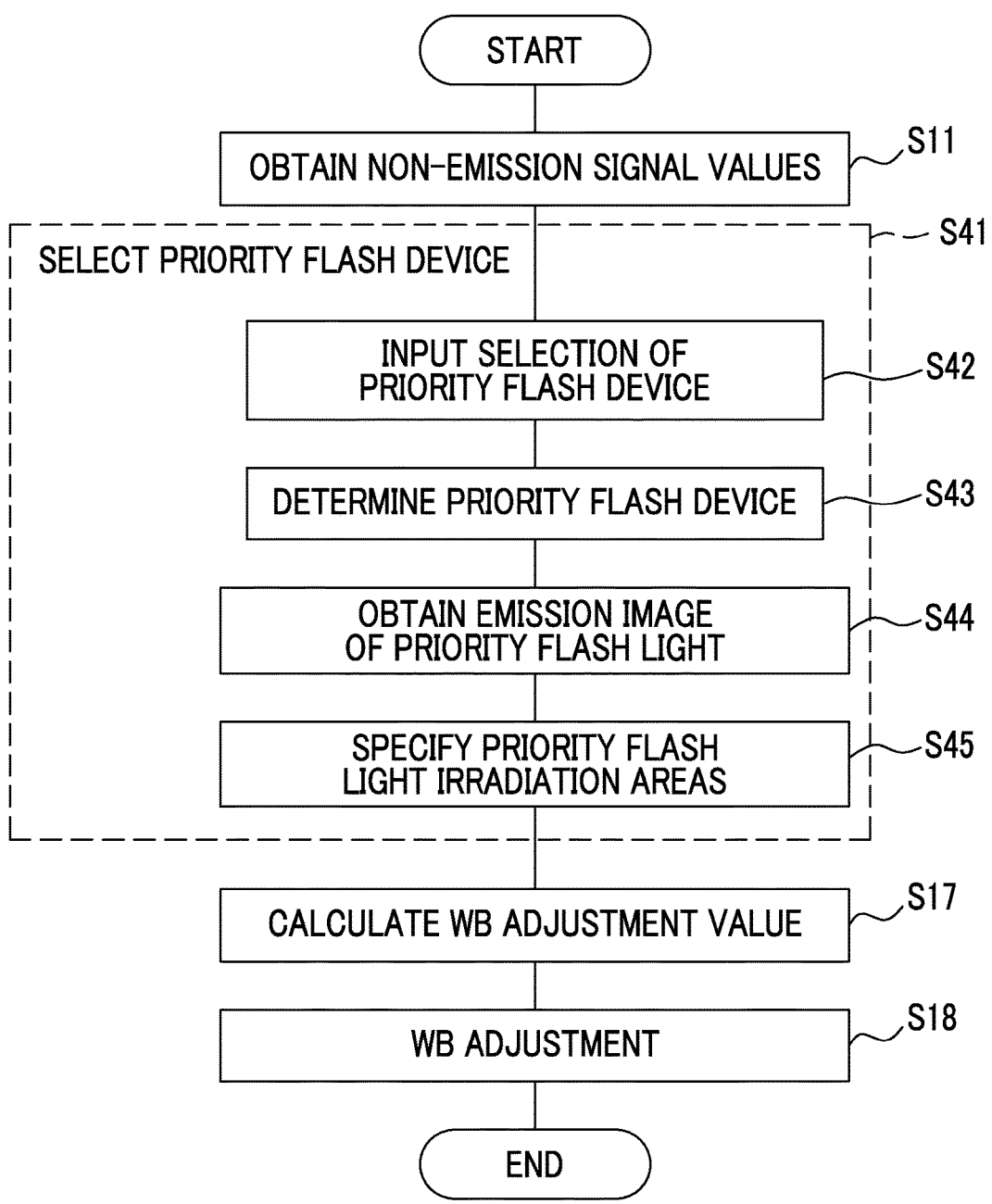
FIG. 22 is a flowchart showing WB adjustment according to the fourth embodiment.

FIG. 22 is a flowchart showing a process procedure according to a fourth embodiment. Non-emission signal value obtaining step S11, WB adjustment value calculating step S17, and WB adjusting step S18 are the same processes as those of the first embodiment, and only priority flash device selecting step S41 is different. Priority flash device selecting step S41 includes priority flash device selection input step S42, priority flash device determining step S43, priority-flash-light emission image obtaining step S44, and priority flash light irradiation area specifying step S45.

Figure 23:
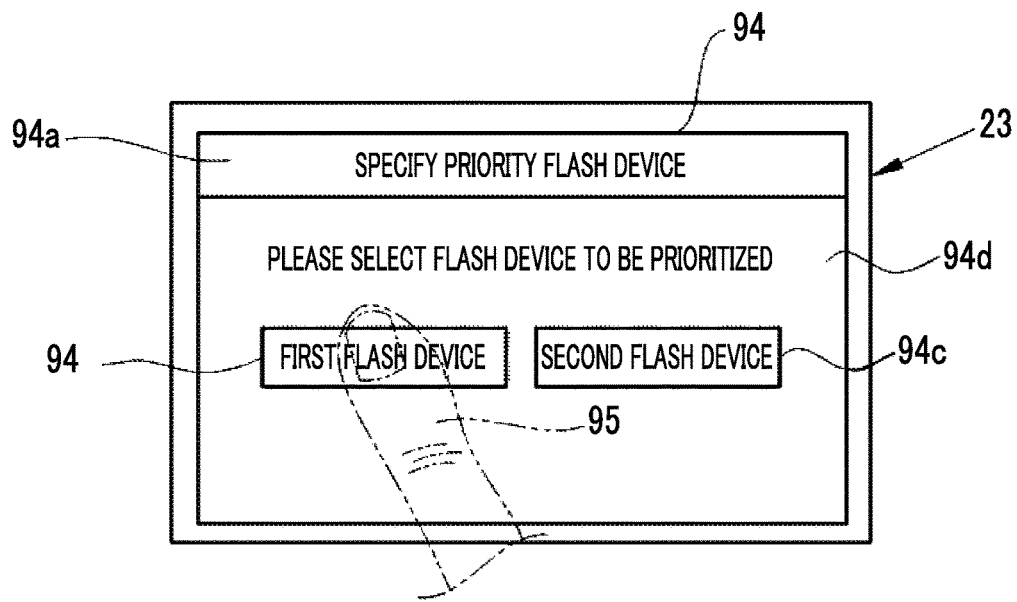
FIG. 23 is a front view showing a priority flash device specifying screen in a selection input step of the priority flash device according to the fourth embodiment.

In priority flash device selection input step S42, a priority flash device specifying screen 94 is displayed on the rear display unit 23 as shown in FIG. 23. A screen title 94a, selection buttons 94b and 94c of the flash devices 12 and 13, and an information text 94d are displayed on the priority flash device specifying screen 94. The priority flash device is selected from the selection button 94b or 94c. The selection is performed by using the touch panel 24. For example, in a case where the flash device 12 of the flash devices 12 and 13 is selected as the priority flash device, the priority flash device is selected by touching the selection button 94b with a finger 95. That is, the touch panel 24 corresponds to a selection input unit that inputs a command to select the priority flash device.

Figure 24:
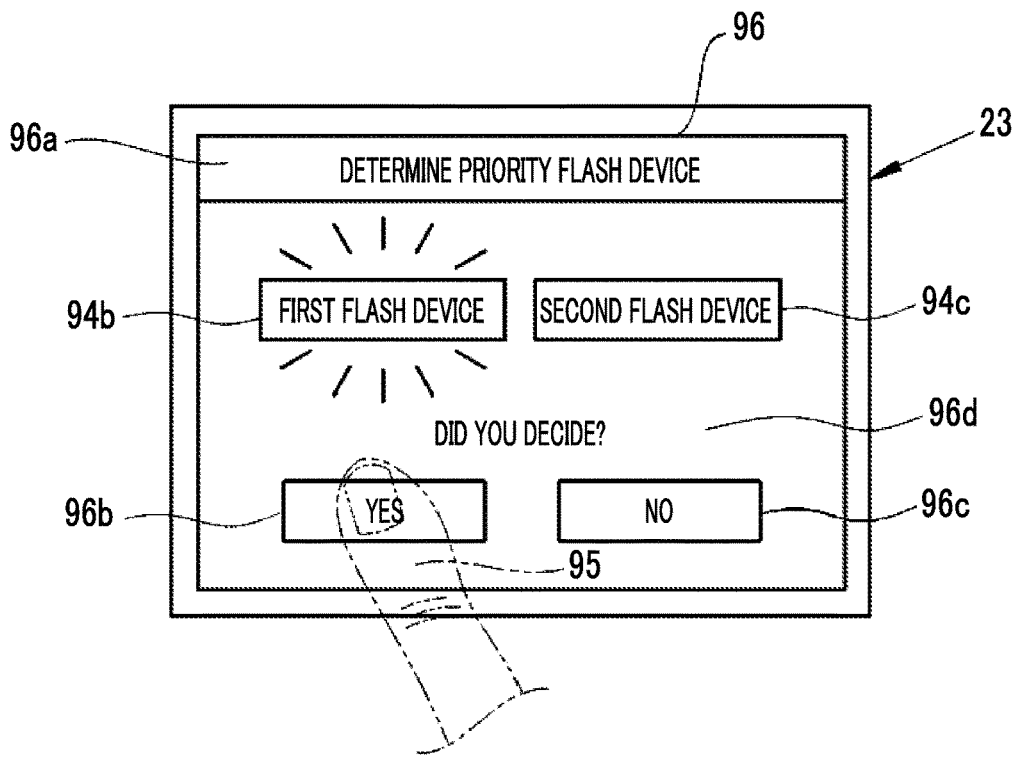
FIG. 24 is a front view showing a priority flash device determining screen in a priority flash device determining step according to the fourth embodiment.

In a case where the selection button 94b or 94c, a priority flash device determining screen 96 shown in FIG. 24 is displayed on the rear display unit 23, and priority flash device determining step S43 is performed. A title 96a, the selection buttons 94b and 94c, confirmation buttons 96b and 96c, or an information text 96d are displayed on the priority flash device determining screen 96. In order to display that the flash device is selected on the priority flash device determining screen 96, the selected selection button (selection button 94b in FIG. 24) of the selection buttons 94b and 94c is displayed so as to be turned on and off. In this state, the confirmation button 96b of the confirmation buttons 96b and 96c which indicates YES is touched with the finger 95, and thus, the selected flash device 12 is specified as the priority flash device.

Although it has been described that the priority flash device is selected and specified by using the touch panel 24, the method of specifying the priority flash device is not limited thereto. For example, the priority flash device may be selected and specified by using the operation switch 22 or using a sound input.

In a case where the priority flash device is determined, emission image obtaining step S44 of the priority flash light is performed as shown in FIG. 22. In step S44, the pre-emission image 61 (see FIG. 5(1)) which is the image of the subjects 5 is captured by the emission image obtaining unit 53b in a state in which only the priority flash device (flash device 12 in the present example) emits light (see FIG. 1), and the emission signal values are obtained based on the pre-emission image 61.

In priority flash light irradiation area specifying step S45, the flash light irradiation area specifying image 63 is created by using the non-emission image 60 and the pre-emission image 61 as shown in FIG. 5. Initially, the non-emission image 60 and the pre-emission image 61 are divided into, for example, 8×8 rectangular division areas 65. Subsequently, a difference is obtained for each division area 65 by subtracting a brightness value Y0 of each division area 65 obtained from the non-emission image 60 from a brightness value Ya of each division area 65 obtained from the first pre-emission image 61. In a case where the difference is larger than those of the other division areas 65, the set of division areas 65 of which the difference is large is specified as the first flash light irradiation areas (priority flash light irradiation areas) 67.

Thereafter, WB adjustment value calculating step S17 is performed based on the signal values of the priority flash light irradiation areas, and the WB is adjusted by using the WB adjustment value in WB adjusting step S18.

Since the user selects the priority flash device, it is possible to simply determine the priority flash device without performing a complicated process such as the detection of the face area, the calculation of the signal value average, or the calculation of the spatial frequency.

In the embodiments, the hardware structure of the processing units that perform various processing such as the non-emission image obtaining unit 53a, the emission image obtaining unit 53b, the flash light irradiation area specifying unit (auxiliary light irradiation area specifying unit) 54, the priority flash device selecting unit (priority auxiliary light source selecting unit) 55, 81, 90, or 93, the WB adjustment value calculating unit 59, the WB adjusting unit 56, the face area detecting unit 57, the priority flash device determining unit (priority auxiliary light source determining unit) 58 or 92, and the spatial frequency calculating unit 91 is realized by various processors as follows. The various processors include a central processing unit (CPU) which is a general-purpose processor functioning as various processing units, a programmable logic device (PLD) which is a processor capable of changing a circuit configuration after a field-programmable gate array is manufactured, and a dedicated electric circuit which is a processor having a dedicated circuit configuration designed for performing a specific process such as an Application-Specific Integrated Circuit (ASIC).

On processing unit may be constituted by one of the various processors, or may be constituted by a combination (for example, a combination of a plurality of FPGAs or a combination of the CPU and the FPGA) of two or processors of the same type or different types. The plurality of processing units may be constituted by one processor. An example in which the plurality of processing units is constituted by one processor is as follows. Firstly, one processor is constituted by a combination of one or more CPUs and software, and this processor functions as the plurality of processing units. Secondly, a processor that realizes all the functions of the system including the plurality of processing units by using one integrated circuit (IC) chip, such as system on chip (SoC), is used. As stated above, the various processing units are constituted by one or more processors of the various processors as a hardware structure.

More specifically, the hardware structure of the various processors is an electric circuitry obtained by combining circuit elements such as semiconductor elements.

From the above description, it is possible to ascertain the invention represented by the following appendix.

APPENDIX 1

There is provided a white balance adjusting apparatus including a non-emission image obtaining processor that obtains a non-emission image by imaging a subject in a state in which a plurality of auxiliary light sources does not emit light, an emission image obtaining processor that obtains emission images of the auxiliary light sources by imaging the subject in a state in which the plurality of auxiliary light sources individually emits light, an auxiliary light irradiation area specifying processor that divides the non-emission image and each of the emission images into a plurality of division areas, and specifies auxiliary light irradiation areas irradiated with auxiliary light of each of the auxiliary light sources based on a signal value difference of each division area between the state in which the plurality of auxiliary light sources individually emits light and the state in which the plurality of auxiliary light sources does not emit light, a priority auxiliary light source selecting processor that selects a priority auxiliary light source as a target of white balance adjustment from the auxiliary light sources, a white balance adjustment value calculating processor that calculates a white balance adjustment value based on signal values of priority auxiliary light irradiation areas irradiated with auxiliary light of the selected priority auxiliary light source, and a white balance adjusting processor that performs adjustment using the white balance adjustment value.

The present invention is not limited to the embodiments or the modification examples, and may adopt various configurations without departing from the gist of the present invention. For example, the embodiments or the modification examples may be appropriately combined.

The present invention is applicable to an imaging device such as a mobile phone or a smartphone in addition to the camera 11.

EXPLANATION OF REFERENCES

- 5: subject
- 6: main subject
- 7: backdrop
- 9: imaging studio
- 10: imaging system
- 11: digital camera (camera)
- 11a: camera main body
- 12: first flash device (auxiliary light source)
- 13: second flash device (auxiliary light source)
- 14: flash light emitting unit
- 15, 16: wireless communication I/F
- 17: flash controller
- 18: flash light emitting unit
- 21: lens barrel
- 22: operation switch
- 23: rear display unit
- 24: touch panel
- 25: imaging optical system
- 26: stop
- 27: shutter
- 28: imaging element
- 29: main controller
- 30: flash controller
- 33: bus
- 34: memory controller
- 35: digital signal processing unit
- 36: media controller
- 37: rear display controller
- 38: touch panel controller
- 39: memory
- 40: recording media
- 41: shutter driver unit
- 45: operation program
- 52: illumination controller
- 53: image obtaining unit
- 53a: non-emission image obtaining unit
- 53b: emission image obtaining unit
- 54: flash light irradiation area specifying unit
- 55: priority flash device selecting unit (priority auxiliary light source selecting unit)
- 56: WB adjusting unit (white balance adjusting unit)
- 57: face area detecting unit
- 58: priority flash device determining unit (priority auxiliary light source determining unit)
- 59: WB adjustment value calculating unit (white balance adjustment value calculating unit)
- 60: non-emission image
- 61, 62: first and second pre-emission images
- 63, 64: flash light irradiation area specifying image
- 65: division area
- 67: first flash light irradiation area
- 68: second flash light irradiation area
- 69: subject image
- 71: face area
- 80: special effect filter
- 81: priority flash device selecting unit (priority auxiliary light source selecting unit)
- 82: ambient light coordinate calculating unit
- 83: flash light recording unit
- 84: difference vector calculating unit
- 85: non-emission signal value average calculating unit
- 86: pre-emission signal value average calculating unit
- 87: signal value average prediction value calculating unit
- 88: special-effect flash light determining unit
- 90: priority flash device selecting unit (priority auxiliary light source selecting unit)
- 91: spatial frequency calculating unit
- 92: priority flash device determining unit (priority auxiliary light source determining unit)
- 93: priority flash device selecting unit (priority auxiliary light source selecting unit)
- 94: priority flash device specifying screen
- 94a: title
- 94b, 94c: selection button
- 94d: information text
- 95: finger
- 96: priority flash device determining screen
- 96a: title
- 96b, 96c: confirmation button
- 96d: information text
- A: light source coordinates of ambient light source
- B: light source coordinates of flash light
- C: vector
- D: non-emission signal value average of flash light irradiation area
- DE: line segment
- E: signal value average prediction value at the time of emitting only flash of flash light irradiation area
- H1 to H6: determination range
- LA: optical axis
- S11: non-emission signal value obtaining step
- S12: pre-emission signal value obtaining step
- S13: flash light irradiation area specifying step (auxiliary light irradiation area specifying step)
- S14: priority flash device selecting step (priority auxiliary light source selecting step)
- S15: face area detecting step
- S16: priority flash device determining step
- S17: WB adjustment value calculating step (white balance adjustment value calculating step)
- S18: WB adjusting step (white balance adjusting step)
- S21, S31, S41: priority flash device selecting step (priority auxiliary light source selecting step)

S22: priority flash device determining step
S32: spatial frequency calculating step
S33: priority flash device determining step
S42: priority flash device selection input step
S43: priority flash device determining step
S44: priority flash light emission image obtaining step
S45: priority flash light irradiation area specifying step
h: width
β: reduction ratio
θ: angle

What is claimed is:

1. A white balance adjusting apparatus comprising:
a processor that:
   obtains a non-emission image by imaging a subject in a state in which a plurality of auxiliary light sources does not emit light;
   obtains emission images of the auxiliary light sources by imaging the subject in a state in which the plurality of auxiliary light sources individually emits light;
   divides the non-emission image and each of the emission images into a plurality of division areas, and specifies auxiliary light irradiation areas irradiated with auxiliary light of each of the auxiliary light sources based on a signal value difference of each division area between the state in which the plurality of auxiliary light sources individually emits light and the state in which the plurality of auxiliary light sources does not emit light;
   selects a priority auxiliary light source as a target of white balance adjustment from the auxiliary light sources;
   calculates a white balance adjustment value based on signal values of priority auxiliary light irradiation areas irradiated with auxiliary light of the selected priority auxiliary light source; and
   performs adjustment using the white balance adjustment value.

2. The white balance adjusting apparatus according to claim 1,
   wherein the processor further:
      detects face areas from the non-emission image or the emission images, and
      specifies which of the auxiliary light irradiation areas the face areas detected are present, and determines that the auxiliary light source corresponding to the auxiliary light irradiation areas including the face areas is the priority auxiliary light source.

3. The white balance adjusting apparatus according to claim 1,
   wherein the processor further determines the priority auxiliary light source based on previously stored light source color information of the auxiliary light source.

4. The white balance adjusting apparatus according to claim 3,
   wherein the processor further sets a determination range in a color space by using the previously stored light source color information of the auxiliary light, light source color information of ambient light obtained from the non-emission image, and pixel information at the time of non-emission of the auxiliary light irradiation areas, and determines the auxiliary light source corresponding to the auxiliary light irradiation areas as the priority auxiliary light source in a case where the pixel information based on the emission image is positioned within the determination range.

5. The white balance adjusting apparatus according to claim 4,
   wherein the light source color information of the auxiliary light is coordinates indicating a color of the auxiliary light in a color space,
   the light source color information of the ambient light is coordinates which are obtained based on the non-emission image and indicate a color of the ambient light in the color space,
   the pixel information at the time of the non-emission of the auxiliary light irradiation areas is coordinates which are obtained based on the non-emission image and indicate a non-emission signal value average of the auxiliary light irradiation areas in the color space, and
   the processor further calculates a difference vector which is a difference between the coordinates of the auxiliary light and the coordinates of the ambient light, obtains a signal value average prediction value at the time of emission of the auxiliary light source by adding the difference vector to the coordinates of the non-emission signal value average, calculates an emission signal value average which is a signal value average of the auxiliary light irradiation areas in the color space based on the emission image, and determines the priority auxiliary light source based on the non-emission signal value average, a signal value average prediction value at the time of the emission of the auxiliary light source, and the emission signal value average.

6. The white balance adjusting apparatus according to claim 5,
   wherein, in a case where the emission signal value average is present in the determination range having the non-emission signal value average and the signal value average prediction value at the time of the emission of the auxiliary light source as both ends, processor further determines that the auxiliary light source corresponding to the auxiliary light irradiation areas is the priority auxiliary light source.

7. The white balance adjusting apparatus according to claim 1,
   wherein the processor further:
      calculates a spatial frequency of the auxiliary light irradiation areas using each of the auxiliary light sources on the non-emission image, and
      excludes the auxiliary light source corresponding to the auxiliary light irradiation areas whose spatial frequency is equal to or smaller than a predetermined value from a selection target of the priority auxiliary light source and determines that the auxiliary light source remaining after the excluding is the priority auxiliary light source, in a case where the spatial frequency of the auxiliary light irradiation area using each of the auxiliary light sources is equal to or smaller than the predetermined value.

8. The white balance adjusting apparatus according to claim 1,
   wherein the processor further calculates actual-emission priority auxiliary light signal prediction values predicted as the signal values of the priority auxiliary light irradiation areas at the time of emitting the priority auxiliary light source with an emission amount at the time of actual emission, and calculates a white balance adjustment value based on the actual-emission priority auxiliary light signal prediction values and the signal values at the time of the non-emission of the priority auxiliary light irradiation areas.

9. The white balance adjusting apparatus according to claim 1,
wherein the processor further obtains an actual emission image obtained by imaging the subject in a state in which the plurality of auxiliary light sources emits light with an emission amount at the time of actual emission, and performs the white balance adjustment using the white balance adjustment value on the actual emission image.

10. An operation method of a white balance adjusting apparatus, the method comprising:
a non-emission image obtaining step of obtaining a non-emission image by imaging a subject in a state in which a plurality of auxiliary light sources does not emit light;
an emission image obtaining step of obtaining emission images of the auxiliary light sources by imaging the subject in a state in which the plurality of auxiliary light sources individually emits light;
an auxiliary light irradiation area specifying step of dividing the non-emission image and each of the emission images into a plurality of division areas, and specifies auxiliary light irradiation areas irradiated with auxiliary light of each of the auxiliary light sources based on a signal value difference of each division area between the state in which the plurality of auxiliary light sources individually emits light and the state in which the plurality of auxiliary light sources does not emit light;
a priority auxiliary light source selecting step of selecting a priority auxiliary light source as a target of white balance adjustment from the auxiliary light sources;
a white balance adjustment value calculating step of calculating a white balance adjustment value based on signal values of priority auxiliary light irradiation areas irradiated with auxiliary light of the selected priority auxiliary light source; and
a white balance adjusting step of performing adjustment using the white balance adjustment value.

11. A non-transitory computer readable medium for storing a computer-executable program for execution of white balance adjustment, the computer-executable program causing a computer to perform:
a non-emission image obtaining step of obtaining a non-emission image by imaging a subject in a state in which a plurality of auxiliary light sources does not emit light;
an emission image obtaining step of obtaining emission images of the auxiliary light sources by imaging the subject in a state in which the plurality of auxiliary light sources individually emits light;
an auxiliary light irradiation area specifying step of dividing the non-emission image and each of the emission images into a plurality of division areas, and specifies auxiliary light irradiation areas irradiated with auxiliary light of each of the auxiliary light sources based on a signal value difference of each division area between the state in which the plurality of auxiliary light sources individually emits light and the state in which the plurality of auxiliary light sources does not emit light;
a priority auxiliary light source selecting step of selecting a priority auxiliary light source as a target of white balance adjustment from the auxiliary light sources;
a white balance adjustment value calculating step of calculating a white balance adjustment value based on signal values of priority auxiliary light irradiation areas irradiated with auxiliary light of the selected priority auxiliary light source; and
a white balance adjusting step of performing adjustment using the white balance adjustment value.

\* \* \* \* \*